US009170851B2

(12) United States Patent
Hamano et al.

(10) Patent No.: US 9,170,851 B2
(45) Date of Patent: Oct. 27, 2015

(54) CONNECTION DISTRIBUTION FOR LOAD BALANCING IN A DISTRIBUTED DATABASE

(75) Inventors: Yasuo Hamano, Kanagawa-ken (JP); Yuki Makino, Tokyo (JP); Mikio Takeuchi, Kanagawa (JP); Gaku Yamamoto, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 13/281,554

(22) Filed: Oct. 26, 2011

(65) Prior Publication Data
US 2012/0131093 A1 May 24, 2012

(30) Foreign Application Priority Data

Nov. 22, 2010 (JP) ................................. 2010-259734

(51) Int. Cl.
G06F 15/173 (2006.01)
G06F 15/16 (2006.01)
G06F 9/50 (2006.01)

(52) U.S. Cl.
CPC .................................... G06F 9/5088 (2013.01)

(58) Field of Classification Search
CPC ..... H04L 41/082; H04L 45/124; H04L 45/22; H04L 12/2602; H04L 41/0806; H04L 41/0803; H04L 41/0816; H04L 41/0836; H04L 41/0853; H04L 41/22; H04L 41/5003; H04L 41/5051; H04L 43/08
USPC .................. 709/223–225, 238–239, 249–250
See application file for complete search history.

(56) References Cited

U.S. PATENT DOCUMENTS

| 6,173,322 | B1 * | 1/2001 | Hu ................................ 709/224 |
| 6,292,905 | B1 * | 9/2001 | Wallach et al. .............. 714/4.12 |
| 6,578,066 | B1 * | 6/2003 | Logan et al. ................... 718/105 |
| 6,986,139 | B1 * | 1/2006 | Kubo ............................. 718/105 |
| 7,039,916 | B2 | 5/2006 | Jason, Jr. |
| 7,171,467 | B2 * | 1/2007 | Carley .......................... 709/224 |

(Continued)

FOREIGN PATENT DOCUMENTS

| JP | 05314179 A | 11/1993 |
| JP | 07065031 A | 3/1995 |

(Continued)

OTHER PUBLICATIONS

International Search Report; International Application No. PCT/JP2011/070460; International filing date: Sep. 8, 2011; Date of Mailing: Oct. 11, 2011; 3 pages.

(Continued)

Primary Examiner — Edward Kim
(74) Attorney, Agent, or Firm — Cantor Colburn LLP

(57) ABSTRACT

An information processing system includes a number of database servers deployed onto a number of physical nodes in a distributed manner. Among the database servers, at least two servers taking care of data different from one another are deployed onto the same physical node and at least one server taking care of the same data as any of the at least two servers are deployed onto at least one other physical node. A distribution section distributes connections by monitoring load on each of the physical nodes and moving a connection with a client from a database server on a physical node with load heavier than a target to a database server on a physical node with load lighter than the target so that the connections are distributed to balance the load.

22 Claims, 14 Drawing Sheets

(56) References Cited

U.S. PATENT DOCUMENTS

| | | | |
|---|---|---|---|
| 7,475,108 B2* | 1/2009 | Di Giulio et al. | 709/203 |
| 7,647,422 B2* | 1/2010 | Singh et al. | 709/238 |
| 7,809,366 B2* | 10/2010 | Rao et al. | 455/419 |
| 7,813,265 B2* | 10/2010 | Patel et al. | 370/217 |
| 8,234,378 B2 | 7/2012 | Stephens et al. | |
| 8,340,076 B2* | 12/2012 | Jetcheva et al. | 370/351 |
| 8,370,450 B2* | 2/2013 | Venkatasubramanian | 709/216 |
| 8,539,035 B2* | 9/2013 | Hotta et al. | 709/207 |
| 2001/0018692 A1* | 8/2001 | Suginoshita et al. | 707/204 |
| 2001/0039574 A1* | 11/2001 | Cowan et al. | 709/223 |
| 2002/0120744 A1* | 8/2002 | Chellis et al. | 709/226 |
| 2003/0065712 A1* | 4/2003 | Cheung et al. | 709/203 |
| 2003/0088698 A1* | 5/2003 | Singh et al. | 709/239 |
| 2004/0078450 A1* | 4/2004 | Chen et al. | 709/214 |
| 2005/0228879 A1* | 10/2005 | Cherkasova et al. | 709/224 |
| 2006/0236325 A1* | 10/2006 | Rao et al. | 719/315 |
| 2007/0073874 A1* | 3/2007 | Moghaddam et al. | 709/224 |
| 2007/0214280 A1* | 9/2007 | Patel et al. | 709/239 |
| 2007/0294385 A1* | 12/2007 | Kapadekar et al. | 709/223 |
| 2008/0052401 A1* | 2/2008 | Bugenhagen et al. | 709/227 |
| 2008/0065746 A1* | 3/2008 | Moghaddam et al. | 709/220 |
| 2008/0065753 A1* | 3/2008 | Rao | 709/223 |
| 2008/0114862 A1* | 5/2008 | Moghaddam et al. | 709/220 |
| 2008/0177767 A1* | 7/2008 | Lin et al. | 707/100 |
| 2008/0183891 A1* | 7/2008 | Ni et al. | 709/239 |
| 2009/0190531 A1* | 7/2009 | Jetcheva et al. | 370/328 |
| 2010/0132022 A1* | 5/2010 | Venkatasubramanian | 726/7 |

FOREIGN PATENT DOCUMENTS

| | | | |
|---|---|---|---|
| JP | 070302218 A | 11/1995 | |
| JP | 08055048 A | 2/1996 | |
| JP | 10097544 A | 4/1998 | |
| JP | 2000020374 A | 1/2000 | |
| JP | 2001175681 A | 6/2001 | |
| JP | 2001297026 A | 10/2001 | |
| JP | 2002222108 A | 8/2002 | |
| JP | 2004054940 A | 2/2004 | |
| JP | 2005309684 A | 11/2005 | |
| JP | 2005338893 A | 12/2005 | |
| JP | 2006209294 A | 8/2006 | |
| JP | 2007317138 A | 12/2007 | |
| JP | 2009230404 A | 10/2009 | |
| JP | 2010238124 A | 10/2010 | |
| TW | 200731136 | 8/2007 | |
| TW | 201031160 A | 8/2010 | |

OTHER PUBLICATIONS

International Preliminary Report on Patentability; International Application No. PCT/JP2011/070460; International filing date: Sep. 8, 2011; Date of Mailing: Oct. 11, 2011; 4 pages.

International Searching Authority Written Opinion; International Application No. PCT/JP2011/070460; International filing date: Sep. 8, 2011; Date of Mailing: Oct. 11, 2011; 3 pages.

Preliminary Report on Patentability and Written Opinion for PCT/JP/2011/070460, mailed Jun. 20, 2013, 6 pages.

Corcoran et al. "A Genetic Algorithm for Fragment Allocation in a Distributed Database System*", University of Tulsa, 1994 ACM, 6 pgs.

Ozsu, et al. "Distributed and Parallel Database Systems", ACM Computing Surveys, vol. 28, No. 1, Mar. 1996; 4 pgs.

Pai et al. "Locality-Aware Request Distribution in Cluster-based Network Servers", ASPLOS VIII Oct. 1998; 1998 ACM; pp. 205-216.

* cited by examiner

CONNECTION DISTRIBUTION FOR LOAD BALANCING IN A DISTRIBUTED DATABASE

PRIORITY

The present application claims priority to Japanese Patent Application No. 2010-259734, filed on 22 Nov. 2010, and all the benefits accruing therefrom under 35 U.S.C. §119, the contents of which in its entirety are herein incorporated by reference.

FIELD OF THE INVENTION

The present invention relates to a distributed database, and more particularly to load balancing between physical nodes in a distributed database environment.

BACKGROUND

It is desired for an application using a database to improve the database performance and capacity according to the volume of data and the amount of access load. Conventionally, as a technique for improving the scalability of the entire system, there has been known a technique for creating a replica of a database and deploying multiple database servers taking care of all data onto multiple physical nodes in a distributed manner to reduce the load (for example, see Japanese Patent Application Publication No. 2001-175681. There has also been known a technique for dividing the database according to the practical search scope to deploy multiple database servers taking care of the divided partitions, respectively, in a distributed manner. Thus, the databases are deployed onto multiple physical nodes in a distributed manner to create a distributed database environment to enable improvement in transaction performance and availability and fault tolerance of the system.

FIG. 14A is a schematic diagram showing a distributed database environment in a conventional technique. A distributed database environment 500 shown in FIG. 14A includes multiple database servers 510a1 to 510c2 deployed onto multiple physical nodes in a distributed manner. In the distributed database environment 500, database partitioning and partition multiplexing are implemented so that each individual database server 510 will take care of data in a different partition or the same partition. Here, the logical unit of databases managed by a group of database servers 510 taking care of the same partition (e.g., 510a1 and 510a2) is referred to as a distributed database 520 (e.g., 520a). In other words, the distributed database 520 consists of an original database (master) taking care of the same partition and replication database (replica) replicated from the master.

As mentioned above, the database is so divided that the data range taken care of by each individual database server 510 to maintain data consistency can be reduced, and each partition is further multiplexed to distribute these database servers 510 onto multiple physical nodes so that the unit of data taken care of by each individual physical node can be reduced. This can increase the transaction performance, improving the availability and fault tolerance of the system. Further, a replica is created and data is multiplexed as mentioned above so that access load from client applications 530 can be distributed, thus improving the availability and fault tolerance of the system.

In such a distributed computing environment, a technique is generally employed, in which database servers 510 of different distributed databases 520 are combined and deployed onto a physical node 540 as the same physical resource as shown in FIG. 14B to make effective use of limited physical resources. However, when multiple database servers 510 are deployed on the same physical node 540, if access is concentrated to a database server (e.g., database A), the database server (e.g., database A) may place pressure on resources of another database server (e.g., database C') on the same physical node (e.g., physical node 540a).

In other words, when a configuration is employed in which multiple database servers are deployed onto the same physical node, there arises the problem of a sudden overload or redundant resources. Countermeasures to this problem include a method of adding a replica of a distributed database 520 in which a sudden increase in load has been observed, a method of enhancing the physical node on which the database server 510 with the sudden load increase observed is deployed, and a method of moving the database server 510 onto another physical node having enough resources. However, in an emergency situation, such as a sudden access increasing state, since these operations themselves place heavy load, they would not be adaptive solutions.

SUMMARY

According to an embodiment of the invention, an information processing system is provided. The information processing system includes a number of database servers deployed onto a number of physical nodes in a distributed manner. Among the number of database servers, at least two servers taking care of data different from one another are deployed onto the same physical node and at least one server taking care of the same data as any of the at least two servers is deployed onto at least one other physical node. The information processing system also includes a distribution section for distributing connections by monitoring load on each of the physical nodes and moving a connection with a client from a database server on a physical node with load heavier than a target to a database server on a physical node with load lighter than the target so that the connections are distributed to balance the load.

According to another embodiment of the invention, an information processing system is provided. The information processing system includes a number of database servers deployed onto a number of physical nodes in a distributed manner. Among the number of database servers, a first server taking care of first data and a second server taking care of second data are deployed onto a first physical node, and a third server taking care of the first data is deployed onto a second physical node. The information processing system also includes a distribution section for monitoring load on the first physical node and the second physical node, and when the load on the first physical node is heavier than a target and the load on the second physical node is lighter than the target, a connection with a client to the first server on the first physical node is moved to the third server on the second physical node.

According to a further embodiment of the invention, an information processing apparatus connected to a number of physical nodes through a network is provided. The information processing apparatus includes a pool part for pooling a number of connections to a number of database servers deployed onto the physical nodes in a distributed manner. Among the number of database servers, at least two servers taking care of data different from one another are deployed onto the same physical node, and at least one server taking care of the same data as any of the at least two servers is deployed onto at least one other physical node. The information processing apparatus also includes a distribution section for distributing connections by monitoring load on the physical nodes and moving a connection with a client from a database server on a physical node with load heavier than a target to a database server on a physical node with load lighter than the target so that the connections are distributed to balance the load.

According to yet another embodiment of the invention, an information processing apparatus connected to a number of physical nodes through a network is provided. The information processing apparatus includes a deployment planning section for creating a plan to deploy a number of database servers onto the physical nodes in a distributed manner to plan database deployment in such a manner that, among the database servers, at least two servers taking care of the same data are not deployed onto the same physical node, at least two servers taking care of data different from one another are deployed onto the same physical node, and at least one server taking care of the same data as any of the at least two servers taking care of the same data and the at least two servers taking care of data different from one another is deployed onto at least one other physical node, respectively, to make a connection with a client transferable from a database server on a physical node with load heavier than a target to a database server on a physical node with load lighter than the target.

According to yet a further embodiment of the invention, a load balancing method is provided. The load balancing method is executed by an information processing apparatus connected to a number of physical nodes through a network, in which a number of database servers are deployed onto the physical nodes in a distributed manner, the database servers characterized such that at least two servers taking care of data different from one another in the database servers are deployed onto the same physical node in the physical nodes and at least one server taking care of the same data as any of the at least two servers is deployed on at least one other physical node, the load balancing method performed by an information processing apparatus. The method includes monitoring load on each of the physical nodes, issuing a request to cut a connection with a client to a database server on a physical node with load heavier than a target in the number of database servers at a transaction boundary, and acquiring a new connection related to reconnection with the client to a database server on a physical node with load lighter than the target in the plurality of database servers.

According to still a further embodiment of the invention, a method of creating a plan executed by an information processing apparatus is provided. The information processing apparatus is connected to a number of physical nodes through a network to deploy a number of database servers onto the physical nodes in a distributed manner. The method is performed by the information processing apparatus and includes planning database deployment in such a manner that, among the database servers, at least two servers taking care of the same data are not deployed onto the same physical node, at least two servers taking care of data different from one another are deployed onto the same physical node, and at least one server taking care of the same data as any of the two or more servers taking care of the same data and the at least two servers taking care of data different from one another is deployed onto at least one other physical node, respectively. The planned deployment is implemented via the planning to make a connection with a client transferable from a database server on a physical node with load heavier than a target to a database server on a physical node with load lighter than the target.

According to a further embodiment of the invention, a computer-executable program causing a computer system including at least one computer to implement a method is provided. The method includes pooling a number of connections, via a pool part, to a number of database servers deployed onto a number of physical nodes in a distributed manner. Among the database servers, at least two servers taking care of data different from one another are deployed onto the same physical node and at least one server taking care of the same data as any of the at least two servers is deployed onto at least one other physical node. The computer also distributes connections, via a distribution section, by monitoring load on the physical nodes and moving a connection with a client from a database server on a physical node with load heavier than a target to a database server on a physical node with load lighter than the target so that the connections are distributed to balance the load.

According to another embodiment of the invention, a computer-executable program causing a computer system including at least one computer to implement a method is provided. The method includes creating a plan, via a deployment planning section, to deploy a number of database servers onto a number of physical nodes in a distributed manner to plan the deployment in such a manner that, among the database servers, at least two servers taking care of the same data are not deployed onto the same physical node, at least two servers taking care of data different from one another are deployed onto the same physical node, and at least one server taking care of the same data as any of the at least two servers taking care of the same data and the at least two servers taking care of data that is different from one another is deployed onto at least one other physical node, respectively, to make a connection with a client transferable from a database server on a physical node with load heavier than a target to a database server on a physical node with load lighter than the target.

DETAILED DESCRIPTION

The present invention provides a flexible load balancing method with operations whose performance cost is low in the event of a sudden overload or redundant resources, thereby resulting in an efficient distributed database environment that minimizes required resources. The present invention also provides an information processing system, an information processing apparatus, a database deployment planning method, and a program, capable of balancing load on physical nodes by the adaptive and flexible method.

The following embodiment describes an information processing system that includes a data processing system including multiple databases deployed onto multiple physical nodes in a distributed manner and client applications accessing the multiple databases. However, it will understood the present invention is not limited to this embodiment and that other forms of information processing systems may be employed in order to realize the advantages of the invention.

Functional Blocks of the System

Figure 1:
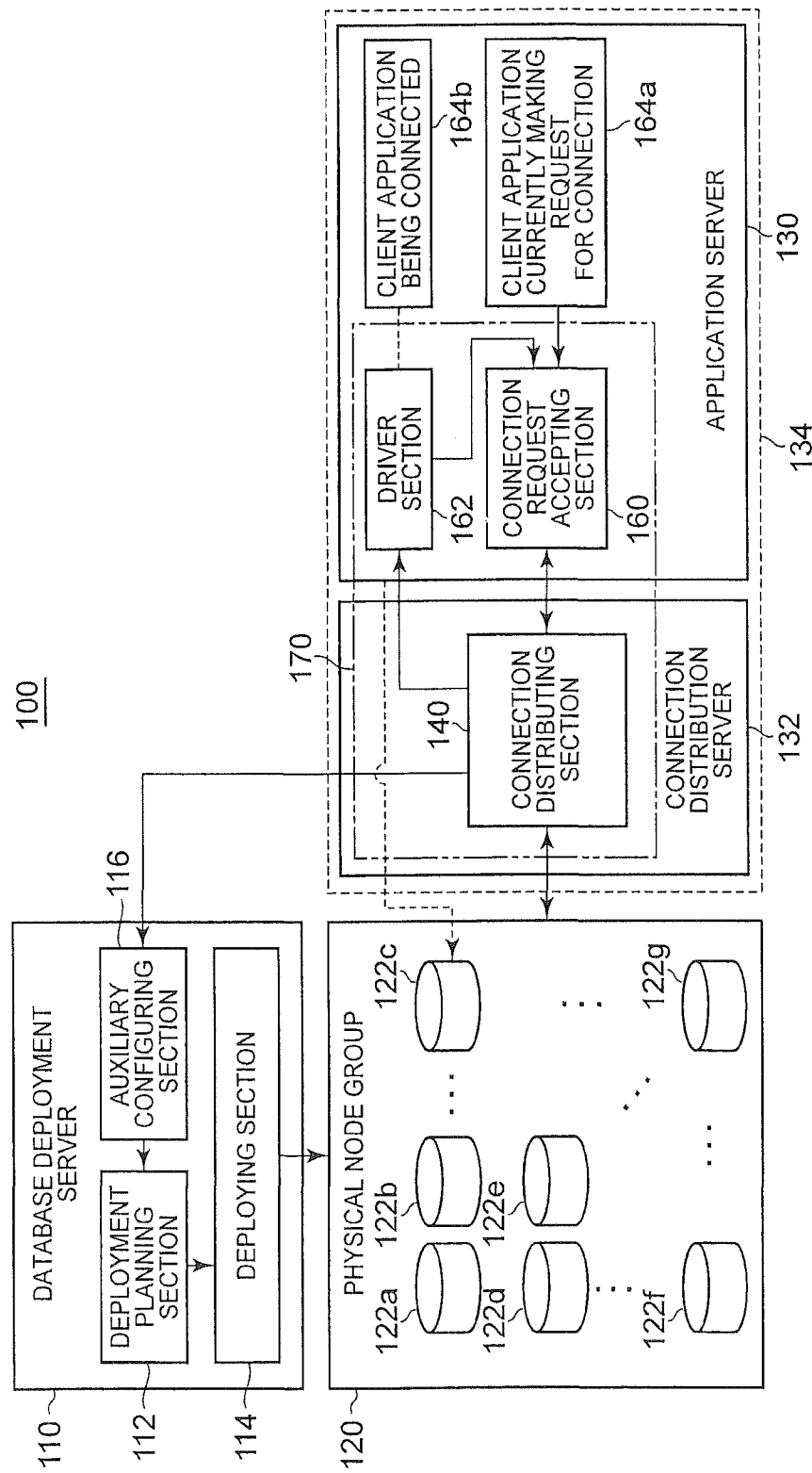
FIG. 1 is a functional block diagram of a data processing system according to an embodiment of the present invention.

FIG. 1 shows functional blocks implemented in a data processing system 100 according to an embodiment of the present invention. The data processing system 100 shown in FIG. 1 is configured to include a physical node group 120 consisting of multiple physical nodes (not shown), a database deployment server 110 for deploying databases onto the physical node group 120 in a distributed manner according to the plan, an application server 130 on which client applications (hereinafter simply called clients) 164 run to access the databases deployed onto the physical node group 120 in a distributed manner, and a connection distribution server 132 the details of which will be described later. Note that the client 164 corresponds to an application layer in a three-layer client server model and a web client is connected to the client 164 via HTTP protocol in a web application, though not shown in FIG. 1.

The physical nodes that construct the physical node group 120, the database deployment server 110, the application server 130, and the connection distribution server 132 are interconnected through wired or wireless networks, not shown, including LAN (Local Area Network) with TCP/IP and Ethernet®, WAN (Wide Area Network) using VPN (Virtual Private Network) or leased lines, and the Internet.

Each of the physical nodes that construct the physical node group 120 includes a central processing unit (CPU) such as a single core processor or a multi-core processor, a cache memory, a RAM, a network interface card (NIC), and a storage device as appropriate, and is operated under the control of an appropriate operating system (hereinafter referred to as OS). For the physical node, either a shared nothing storage or shared disk architecture may be employed.

A database management system (DBMS) that supports a distributed database is introduced into the physical node group 120, and multiple database servers 122a to 122g are deployed on the physical node group 120. Here, the "database server" means a server process of the DBMS operated on each physical node, and the "database" means collections of data including database objects, such as tables, views, and indexes managed by the DBMS. Note that the database server and the database as a collection of data may also be collectively referred to as the "database" below.

The individual database servers 122 can take care of different data, respectively, or same data. Here, the unit of a logical database group consisting of database servers 122 taking care of the same data is referred to as a "distributed database." For convenience, among individual databases that configure the distributed database, an original is called a master database (hereinafter simply called a master), and a database replicated from the master is called a replica database (hereinafter simply called a replica). The replication method is not particularly limited, and either a multi-master method or a master-slave method may be employed.

Thus, in the data processing system 100, a distributed database environment consisting of multiple distributed databases including a master and one or more replicas is constructed by the multiple database servers 122a to 122g deployed onto the physical node group 120 in a distributed manner. The "database" and the "distributed database" can be, but not limited to, a relational database (RDB), and be applied to any other database, such as an object-oriented database, an XML (extensible Markup Language) database, and a key-value data store, without being limited to a particular data model.

The database deployment server 110, the application server 130, and the connection distribution server 132 are generally configured as general-purpose computers, such as personal computers, workstations, rack-mount or blade servers, mid-range computers, or mainframe computers. To be more specific, the database deployment server 110, the application server 130, and the connection distribution server 132 each includes a CPU such as a single core processor or a multi-core processor, a cache memory, a RAM, a NIC, a storage device, and the like, in which hardware and software cooperate to implement each function section and each processing to be described later under the control of an appropriate OS.

The database deployment server 110 includes a deployment planning section 112 for planning database deployment to realize efficient load balancing and a deploying section 114. The deploying section 114 is a functional section for deploying the database servers 122 of distributed databases onto the physical node group 120 according to the database deployment plan created by the deployment planning section 112. In the embodiment, the database deployment server 110 can further include an auxiliary configuring section 116 for monitoring load imbalance between physical nodes in a long-term span and altering the database deployment appropriately to eliminate the load imbalance. The details of the database deployment plan and auxiliary configuration to reduce the load imbalance is described further herein.

A connection management mechanism 170 is provided between the clients 164 on the application server 130 and the distributed database environment on the physical node group 120 to carry out a function for distributing a database connection (hereinafter simply called a connection) established between each client 164 and a database server entity (master or replica) of the distributed database in such a manner to balance the load on the physical nodes. The term "connection" can include the fixation of a destination by setting a relation of affinity with the request or the like.

In the conventional distributed database environment, when load distribution is accomplished using a master and one or more replicas of database servers, these database servers are deployed on different physical nodes, and connections are allocated to the master and the one or more replicas in round-robin fashion, for example. In this case, since the connections are distributed at a fixed rate, when two or more distributed database server entities are deployed onto the same physical node to make effective use of physical resources, if access is concentrated to one distributed database server entity, it may place pressure on the resources of the other distributed database server entity on the same physical node. In such a situation, it is common practice in the conventional technique to enhance the physical resources and add replicas in order to respond to the situation, but when a sudden overload has occurred or resources become redundant, it is difficult to cope therewith suitably.

Therefore, in the embodiment, the connection management mechanism 170 adopts a configuration to dynamically control the rate of distribution of connections, established between the clients 164 and the database server entities of the distributed databases, to the master and the replica(s) on the physical node group 120 according to the load status to adaptively cope with such a sudden increase and decrease in load, balancing the load between physical nodes on which the master and the replica(s) are deployed.

The connection management mechanism 170 includes a connection distributing section 140, a connection request accepting section 160, and a driver section 162. In the embodiment shown in FIG. 1, the connection distributing section 140 is implemented on the connection distribution server 132, and the connection request accepting section 160 and the driver section 162 are implemented as client-side modules on the application server 130 on which a client application runs. In this case, the connection distribution server 132 can be configured as a connection distribution server for distributing connections to the respective clients 164 on multiple application servers 130 in a unified way. A client 164a in FIG. 1 represents a client application currently requesting a connection to be newly established. On the other hand, a client 164b represents a client application that has already established a connection and is currently connected.

The connection request accepting section 160 acquires a connection from the connection distributing section 140 in response to the connection request from the client 164a trying to newly establish a connection, and establishes a connection between the client 164a and a database server entity of the distributed database. The connection distributing section 140 monitors the load on each physical node to decide on the rate of connection distribution to a distributed database server entity (master or replica) according to the load status. The connection distributing section 140 returns a connection to the database server entity according to the decided rate of connection distribution in response to an acquisition request from the connection request accepting section 160.

When the existence of an overloaded physical node is found according to the above load status, the connection distributing section 140 requests the driver section 162 to cut and reestablish or reconnect a connection corresponding to the overload among the connections to the database server entities on the physical node. The driver section 162 controls the connections between the client 164b and the database server entities of the distributed databases. In response to the reconnection request from the connection distributing section 140, the driver section 162 once cuts the connection, for which the reconnection has been requested, at a transaction boundary. Then, the driver section 162 acquires a new connection from the connection request accepting section 160 to continue the connection between the client 164 and the database server entity. Thus, since the connection is cut at the transaction boundary, the cutting and the reconnection can be hidden from the user. The driver section 162 constitutes a reconnection control section in the embodiment.

The connection distributing section 140 according to the embodiment monitors the load on each physical node, decides on the rate of connection distribution according to the load status of the physical node group 120, and also requests the driver section 162 to reconnect the overloaded connection. Thus, the connection with the client is moved from a database server entity on a physical node with load heavier than a target thereon to a database server entity on a physical node with load lighter than the target thereon, thus balancing the load between nodes.

Connection Distribution

Figure 2A:
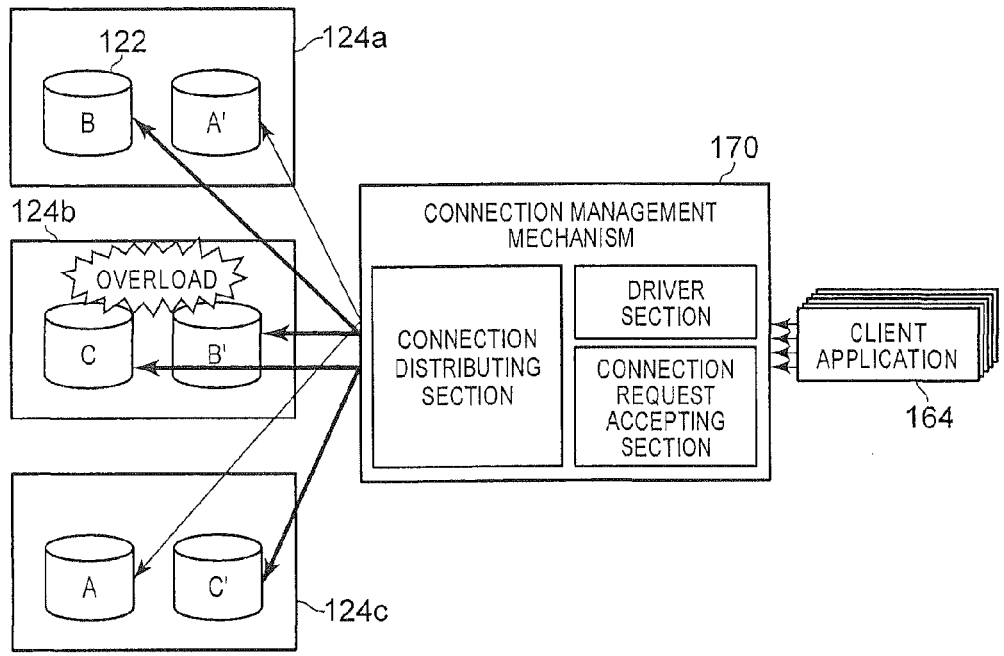
FIG. 2 is a conceptual diagram for describing connection distribution according to an embodiment of the present invention.

The connection distribution according to an embodiment of the present invention will now be described with reference to FIG. 2. FIG. 2 is a conceptual diagram for describing the connection distribution according to the embodiment of the present invention. FIG. 2A is a diagram showing a state of connections before the connection distribution is carried out, and FIG. 2B is a diagram showing a state of connections when the connection distribution has been performed.

FIG. 2 shows a state in which two database servers are deployed on each of physical nodes 124a, 124b, and 124c. Each database server corresponds to a master or a replica of any of distributed database instances indicated by A, B, and C. For example, the distributed databases A, B, and C can take care of partitions divided from a single database or data of different databases, respectively. Note that X (where X is any alphabetical letter) stands for a master, and X' (where X is any alphabetical letter as well) stands for a replica.

The connection management mechanism 170 manages connections between each client 164 and database server entities of distributed databases, and distributes connections between a master and a replica(s) of each distributed database. As shown in FIG. 2A, for example, when access is concentrated to distributed databases B and C, if the rate of connection distribution is fixed, a physical node 124b accommodating database server entities C and B' will be overloaded.

Figure 2B:
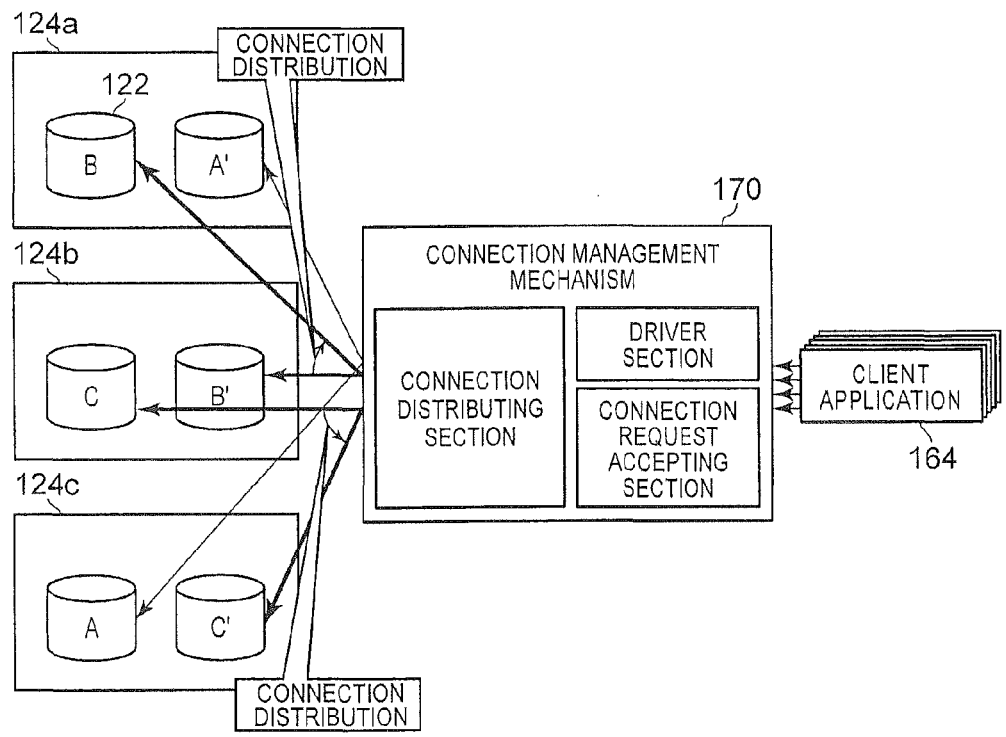

Therefore, as shown in FIG. 2B, the connection management mechanism 170 of the embodiment once cuts, at a transaction boundary, connections corresponding to the overload among connections allocated to database server entities B' and C on the overloaded physical node 124b. Further, the connection management mechanism 170 performs reconnection after changing the rates of connection distribution between database server entities B and B' and between database server entities C and C' operated on different physical nodes not only to maintain the connections from the client 164 but also reduce the overload on the physical node 124b. At this time, the rates of connection distribution are stochastically decided in such a manner that more load will be distributed to database server entity B on a physical node 124a and database server entity C' on a physical node 124c, both of which have lighter load.

The connection distribution between the master and one or more replicas of the distributed databases is carried out to move the load from a physical node with a relatively heavy load placed thereon to a physical node with a relatively light load placed thereon so that the peak of the entire load on the physical node group 120 can be relatively balanced out.

On the other hand, it is desired to deploy each database server entity on the physical node group 120 effectively to move the load by the connection distribution in order to balance the load on the entire physical node group 120 efficiently. The following will describe database deployment that is advantageous to balance the load using the connection distribution with reference to FIG. 3 to FIG. 5.

Load Balancing Enabled Relation

Figure 3A:
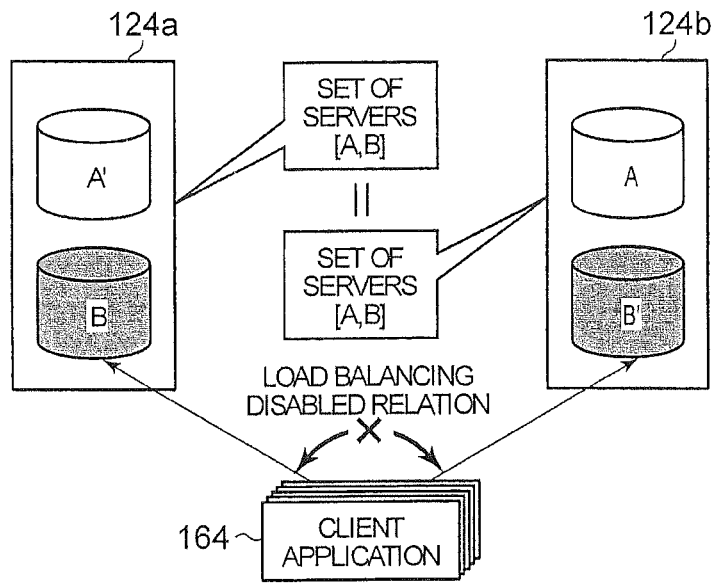
FIG. 3 is a diagram for describing a relation in which load balancing by the connection distribution is enabled.
Figure 3B:
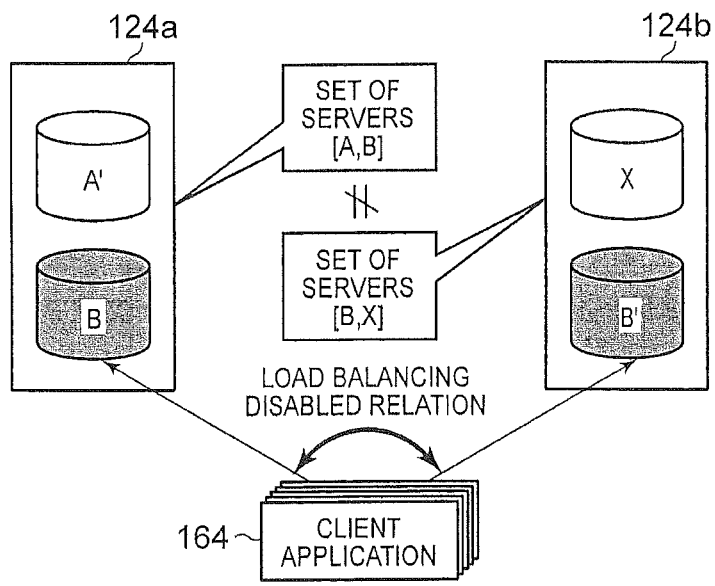

FIG. 3 is a diagram for describing a relation in which load balancing by the connection distribution is enabled. FIG. 3 shows a relationship between two physical nodes 124*a* and 124*b*, where two database servers are deployed on each of the physical nodes 124*a* and 124*b*. FIG. 3A illustrates a relation in which load balancing by the connection distribution is disabled or impossible and FIG. 3B illustrates a relation in which load balancing by the connection distribution is enabled or possible.

In the load balancing disabled relation shown in FIG. 3A, considering a server set having the distributed databases A and B as elements, the server sets on the physical node 124*a* and the physical node 124*b* are identical. On the other hand, in the load balancing enabled relation shown in FIG. 3B, the server set (A, B) on the physical node 124*a* is different from the server set {B, X} on the physical node 124*b*.

As mentioned above, the load can be moved between a master and one or more replicas of distributed databases deployed on different physical nodes. However, as shown in FIG. 3A, if all the server sets on physical nodes with the master and replica of distributed databases deployed thereon are the same, the load cannot be actually balanced by the connection distribution. Therefore, in order to balance the load on a distributed database by the connection distribution, at least server sets on physical nodes with the master and the replica deployed thereon need to be different from each other. Further, it is more desirable that the difference between the server sets on the physical nodes with the master and the replica deployed thereon be large.

Database Deployment to Achieve Efficient Load Balancing

Figure 4A:
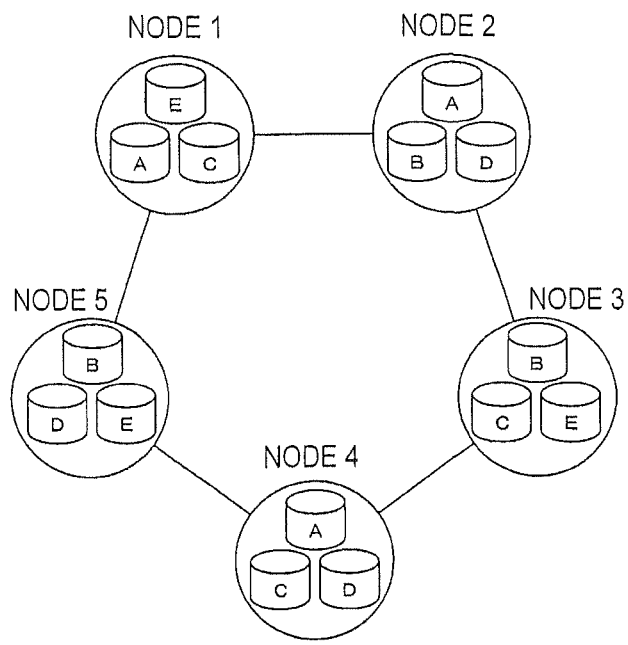
FIG. 4 is a diagram illustrating database deployment in which respective database servers of five distributed databases with a multiplicity of 3 are deployed onto five physical nodes in a distributed manner.
Figure 4B:
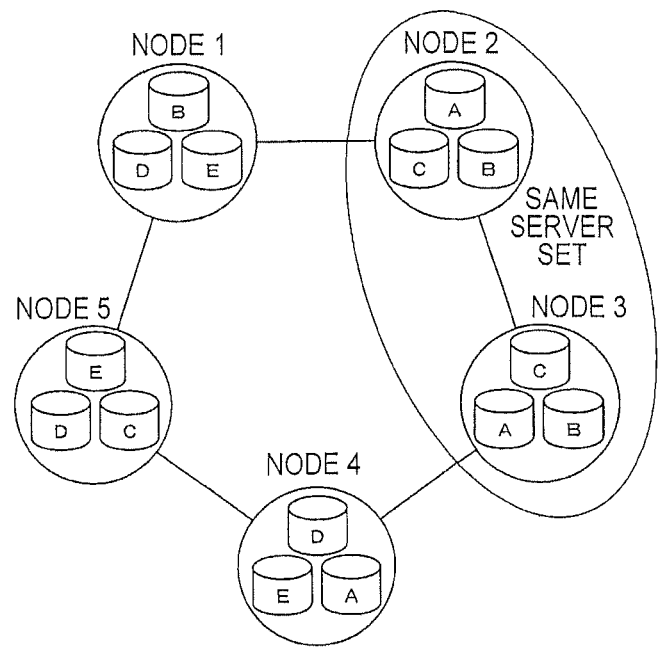
Figure 5:
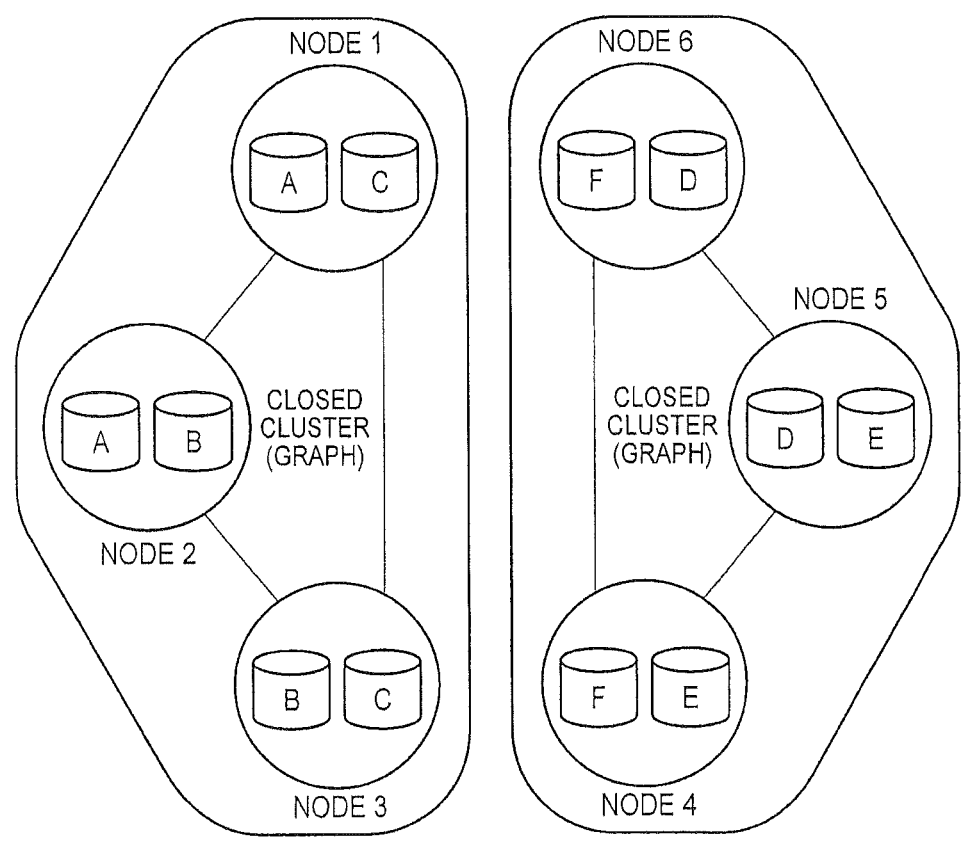
FIG. 5 is a diagram illustrating database deployment in which respective database server entities of six distributed databases with a multiplicity of 2 are deployed onto six physical nodes in a distributed manner.

The following will describe database deployment to achieve efficient load balancing with reference to FIG. 4 and FIG. 5. FIG. 4 illustrates database deployment in which respective database servers of five distributed databases with a multiplicity of 3 are deployed onto five physical nodes in a distributed manner. FIG. 5 illustrates database deployment in which respective database servers of six distributed databases with a multiplicity of 2 are deployed onto six physical nodes in a distributed manner.

In the database deployment shown in FIG. 4A, all the five distributed databases A to E are deployed such that server sets on physical nodes with database server entities of each distributed database deployed thereon are different from one another. For example, server sets on physical nodes Node 1, Node 2, and Node 4 with the server entities of distributed database A deployed thereon are {A, C, E}, {A, B, D}, and {A, C, D}, respectively, which are different from one another. The same holds true for the other distributed databases B to E. Therefore, in the database deployment shown in FIG. 4A, the load can be efficiently moved from a physical node with heavy load placed thereon to a physical node with light load placed thereon, so that the peak of the entire load on the physical node group 120 can be smoothened.

In contrast, in the database deployment shown in FIG. 4B, the same server sets of distributed databases A to C exist on physical nodes. Node 2 and Node 3 have server entities of distributed databases A to C in common, and server sets of these physical nodes are identical. On the other hand, the master or replica of any of the distributed databases A to C also exists on each of physical nodes (Node 1, Node 4, and Node 5) other than the physical node Node 2 and Node 3. Therefore, the load can be moved among the physical nodes Node 2, Node 3 and the other physical nodes (Node 1, Node 4, Node 5), and hence the load on the physical nodes can be balanced as a whole in the database deployment shown in FIG. 4. However, the existence of multiple physical nodes having the same server set limits the degree of freedom of transferring the load.

Further, in order to balance the entire load on the physical node group 120 efficiently, it is desirable that the above-mentioned transferable relations be expanded as wide as possible with more physical nodes involved in the physical node group 120. As mentioned above, the load can be directly moved between the master and a replica of the same distributed database deployed on different physical nodes. On the other hand, the load can also be moved indirectly between the master and a replica of different distributed databases by going through a transferable relation in the same distributed database. Thus, the above-mentioned expansion of a transferable relation as a feature of the database deployment can be quantitatively determined as the size of a cluster created by regarding the physical nodes and load transferable relations as a graph to connect physical nodes having transferable relations.

In other words, the expansion can be quantitatively determined by the size of a cluster which is a graph created by connecting, including different distributed databases, sides (edges or links) between physical nodes on which the same distributed database server entity is deployed. If the cluster is so small that it will be closed in part of the physical node group 120, load balancing is limited within the small cluster.

Considering that the load is balanced on physical nodes each accommodating two or more distributed database server entities, the expansion of the cluster as the feature of the database deployment can be quantitatively determined by the number of nodes of a cluster which is created by connecting sides between physical nodes on which the same distributed database server entity is deployed and includes physical nodes accommodating database servers of two or more different distributed databases. Considering that a distributed database is configured to include a master and one or more replicas, it is desirable for the number of nodes in each cluster be three or more. Further, in view of load balancing of the entire physical node group 120, it is more desirable that the number of nodes should correspond exactly to the number of physical nodes in the physical node group 120.

For example, in the database deployment shown in FIG. 4A and FIG. 4B, the number of cluster nodes is equal to the number of physical nodes, so that the entire load on the physical node group 120 can be balanced. On the other hand, database deployment shown in FIG. 5 includes two closed clusters in the physical node group 120. In this case, since no distributed database deployed on both clusters in common exists, the load cannot be moved between the clusters. This results in load balancing carried out independently in the cluster consisting of physical nodes Node 1, Node 2, and Node 3 and in the cluster consisting of physical nodes Node 4, Node 5, and Node 6, respectively.

Details of Connection Distribution

Detailed Functional Blocks Related to Connection Distribution

Figure 6:
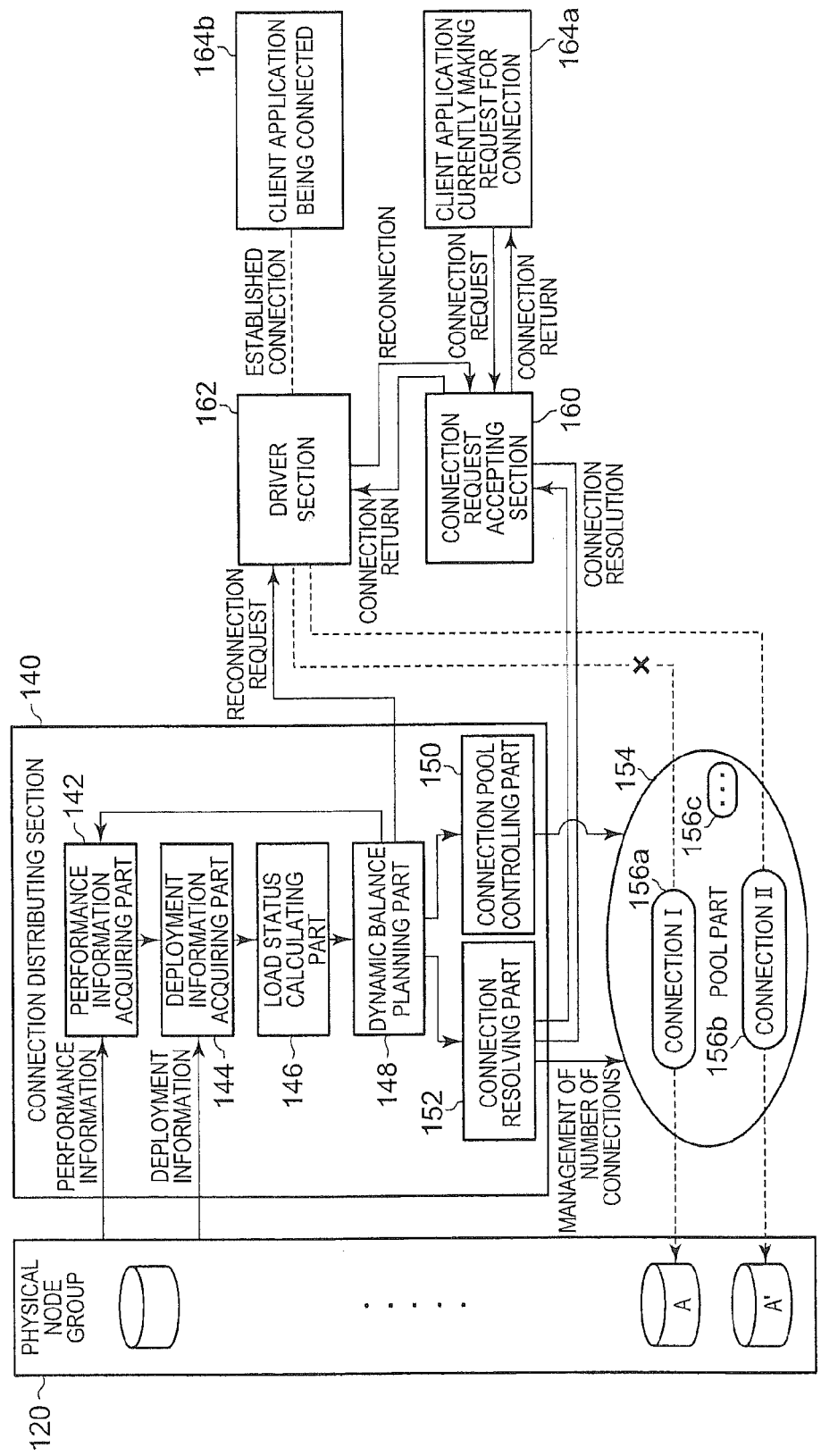
FIG. 6 is a detailed functional block diagram related to the connection distribution realized in the data processing system according to an embodiment of the present invention.

The following will describe the details of connection distribution to accomplish load balancing between physical nodes. FIG. 6 shows detailed functional blocks related to the connection distribution accomplished in the data processing system 100 according to the embodiment of the present invention. Shown in FIG. 6 are the physical node group 120 in which multiple database servers are deployed, the connection distributing section 140, the connection request accepting section 160, the driver section 162, and the clients 164.

In particular, the connection distributing section 140 includes a performance information acquiring part 142, a deployment information acquiring part 144, a load status calculating part 146, a dynamic balance planning part 148, a connection pool controlling part 150, and a connection resolving part 152.

The performance information acquiring part 142 monitors the performance of the distributed database environment and acquires performance information periodically or on an irregular basis. The performance information may be information for quantitatively determining the load on the physical node including, but not limited to, the usage value (usage rate) of each of physical resources of each physical node, such as the CPU, disk I/O and the memory, the total number of connections of each physical node, etc. The performance information for each distributed database may be information for quantitatively determining the load on each distributed database, such as the number of connections for each distributed database, the amount of increase in table data, database area usage, query response time, and the number of users. Such information can be acquired from a performance monitoring tool placed in the distributed database environment.

The deployment information acquiring part 144 acquires deployment information on the distributed database environment periodically or on an irregular basis. The deployment information is information describing the deployment of database server entities on the physical node group 120, indicating which distributed database server entity is deployed on each physical node. In brief, the deployment information is created as a list of server sets for each physical node.

The load status calculating part 146 multiplies the performance information, acquired by the performance information acquiring part 142, by the deployment information acquired by the deployment information acquiring part 144 to calculate load status for each physical node. The load status calculated for each physical node includes the evaluation amount of load on each physical node to quantitatively determine the load on the physical node to be balanced and the proportion of each database server entity on each physical node in the evaluation amount of load.

The method of calculating the evaluation amount of load is not particularly limited as long as the load on each physical node can be quantitatively determined. For example, the resource usage value (usage rate) and the number of connections of each physical node, both of which are acquirable, may be used intact. The method of calculating the proportion in the evaluation amount of load is not particularly limited as well. For example, distributed databases (i.e., a server set) the server entities of which are deployed on a physical node, the number of connections of each distributed database and the rate of connection distribution of each distributed database to each server entity can be used to calculate the proportion of each server entity in the evaluation amount of load on the physical node. The rate of connection distribution can be, for example, acquired from the dynamic balance planning part 148 which is described further herein.

The dynamic balance planning part 148 considers the current connection status and the amount of change in connection estimated at predetermined intervals to decide on a target value for deciding the rate of connection distribution in order to plan the connection distribution and reconnection so that the evaluation amount of load on each physical node will approach asymptotically to the target value. To be more specific, the dynamic balance planning part 148 plans new connection distribution including reconnection to each distributed database server entity at a rate or probability of distribution corresponding to an amount of load below the target according to the load status calculated by the load status calculating part 146.

The connection pool controlling part 150 prepares for a sufficient amount of connection 156 in a pool part 154 according to the rate of connection distribution planned by the dynamic balance planning part 148. The connection resolving part 152 manages the number of connections for the pool part 154 such as the maximum number of connections let out of the pool. In response to a connection resolution request from the connection request accepting section 160, the connection resolving part 152 passes, as a reply to the request, a requested connection to a distributed database server entity among the connections 156 pooled in the pool part 154. At this time, the connection to the server entity to be established is passed at a probability corresponding to the above rate of distribution. In response to a connection request from the requesting client 164a, the connection request accepting section 160 issues a connection resolution request to the connection resolving part 152 to establish a connection between the requesting client 164a and the distributed database server entity, and returns reference of the connection to the client 164a.

In the embodiment, connection pooling by the connection pool controlling part 150 and the connection resolving part 152 is applied to reuse the connection to the database server entity of a distributed database, so that overhead due to various processing such as authentication upon establishment of a connection between a client and a server entity can be reduced.

When the existence of a physical node with heavy load placed thereon is found further from the load status calculated by the load status calculating part 146, the dynamic balance planning part 148 plans to cut and reconnect a number of connections corresponding to an amount of load exceeding the target value and makes a request to the driver section 162 for reconnection. In response to the reconnection request from the dynamic balance planning part 148, the driver section 162 requests the connection request accepting section 160 to once cut and reconnect the connections according to the reconnection request at transaction boundaries. Upon receipt of this request, the connection request accepting section 160 issues a connection resolution request to the connection resolving part 152, establishes new connections with distributed database server entities, and returns reference of the new connections to the driver section 162.

For example, if that excess load is placed on a physical node on which database server entity A is deployed, the driver section 162 once cuts connection 1156a to the server entity A, and makes a request to the connection request accepting section 160 for reconnection. For example, the connection request accepting section 160 acquires connection II 156b to database server entity A' to maintain the connection between the distributed database A and the client.

The connection distribution and reconnection are planned by the above-mentioned dynamic balance planning part 148, and the reconnection is made by the connection request accepting section 160 and the driver section 162, the connection to a server entity on a physical node on which load heavier than the target is cut, and the connection is changed to a server entity on a physical node with lighter load thereon, thus smoothing the load between physical nodes.

Connection Distribution Method

Figure 7:
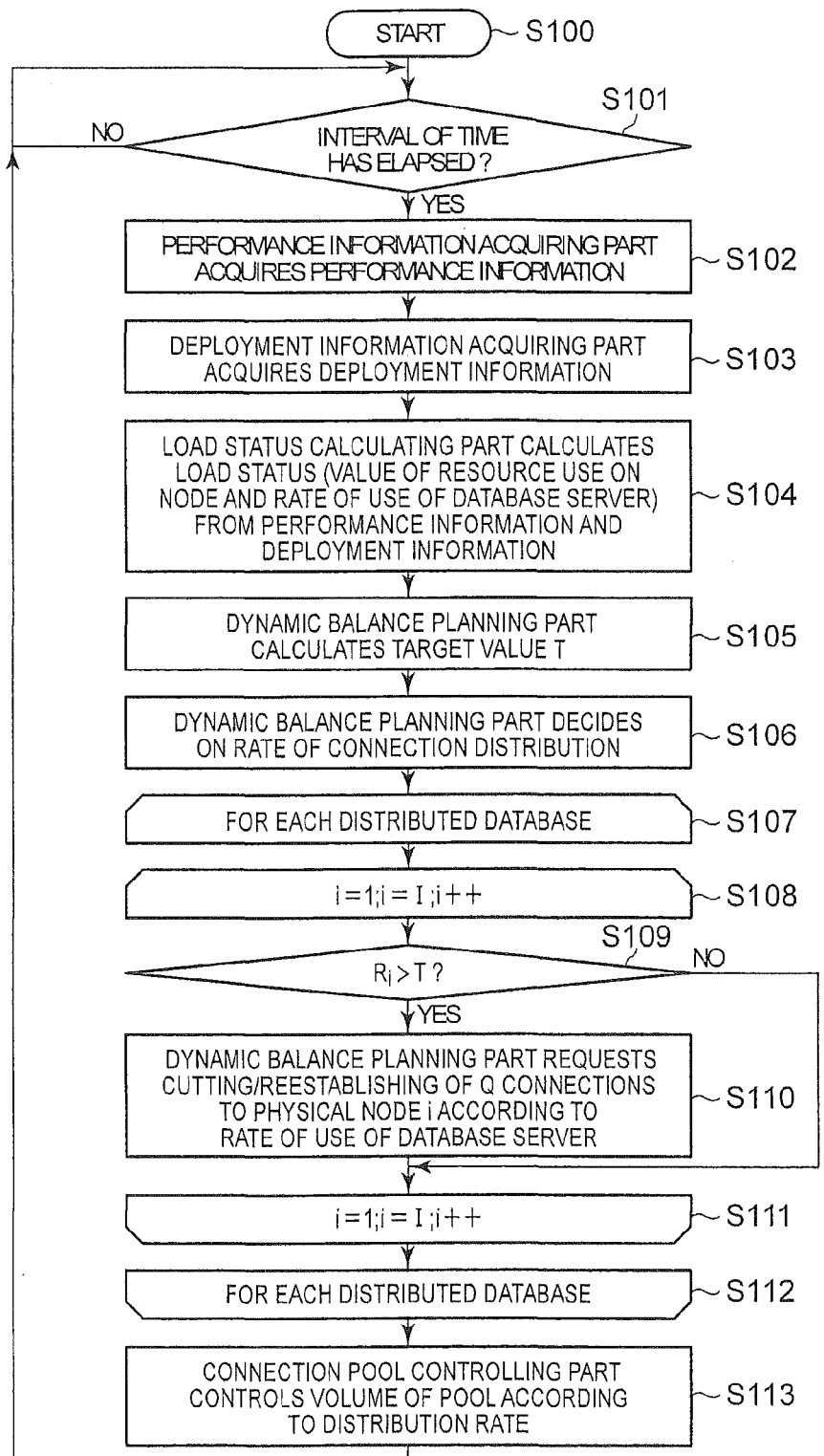
FIG. 7 is a flowchart showing connection distribution processing performed by a connection distributing section according to an embodiment of the present invention.

The following will describe connection distribution processing performed by the connection distributing section 140 in more detail with reference to FIG. 7. FIG. 7 is a flowchart showing connection distribution processing performed by the connection distributing section 140. The processing shown in FIG. 7 starts at step S100, for example, in response to starting the service of a connection distribution function.

In step S101, the connection distributing section 140 loops back to step S101 until a predetermined interval of time has elapsed (during NO in step s101). This interval of time is an interval to control the connection distribution, and a time interval according to the amount of change in load dependent on the characteristics of the client application can be set. After the predetermined interval of time has elapsed in step S101 (YES), the procedure proceeds to step S102.

In step S102, the performance information acquiring part 142 acquires performance information on the distributed database environment. In step S103, the deployment information acquiring part 144 acquires deployment information on the distributed database environment. In step S104, the load status calculating part 146 uses the acquired performance information and deployment information to calculate load status including the evaluation amount of load for each physical node and the proportion of each database server entity on each physical node in the evaluation amount of load. In the embodiment described below, the resource usage value for each physical node and the proportion or rate of each database server entity on the physical node with respect to the resource usage value (hereinafter called the resource usage rate) are used as the load status for each physical node.

In step S105, the dynamic balance planning part 148 calculates a target value T for the resource usage value according to the following mathematical expression (1), where the resource usage value of physical node i (i=1, ..., I) to which the server entity belongs and calculated by the load status calculating part 146 is Ri, an average value of increases in the number of connections that could occur during the predetermined interval of time is C, and the resource usage value corresponding to one connection is r:

[Expression 1]

$$T = \frac{C \cdot r + \sum_{i=1}^{I} R_i}{I} \quad (1)$$

Here, the target value T is a control target value for deciding on the rate of connection distribution to balance the load on each physical node in consideration of the current connection status and changes in connection during the predetermined interval of time. The average value C of increases in the number of connections can be acquired, for example, as a performance value from the database side. In step S106, the dynamic balance planning part 148 decides on the rate of connection distribution to a server entity on each physical node according to the calculated target value T. Here, assuming that a common distributed database server entity is deployed on each physical node i (i=1, ..., I), the ratios of connection distribution to each server entity of the distributed database on each physical node i is T−$R_1$:T−$R_2$: ... :T−$R_I$.

In the above mathematical expression (1), the resource usage value r corresponding to one connection is a corresponding value in the resource usage value on the physical node, and if the total number of connections of each physical node can be acquired as the performance information, the corresponding value can be calculated by focusing on a physical node with the heaviest load thereon according to the following mathematical expression (2), where the resource usage value of the physical node is Rs and the total number of connections on the physical node is m:

[Expression 2]

$$r = \frac{R_s}{m} \quad (2)$$

Alternatively, if the number of connections of all the distributed databases can be acquired as the performance information, the resource usage value r corresponding to one connection can also be calculated in such a manner that a distributed database with the heaviest load thereon is focused on to calculate the total usage value for the resources used by the distributed database from the resource usage value of each physical node on which the distributed database server entity is deployed and the resource usage rate of the distributed database server entity on each physical node, and divide it by the number of connections to all the distributed databases.

In a loop from step S107 to step S112, processing steps S108 to S111 are executed on each distributed database. In a loop from step S108 to step S111, processing steps S109 and S110 are executed on the focused distributed database for each of the i-th to I-th physical nodes i to detect the existence of a physical node on which load exceeding the target value is placed. In step S109, the dynamic balance planning part 148 compares the resource usage value Ri of the physical node i with the above-mentioned target value T to determine whether the resource usage value Ri exceeds the target value T. If it is determined in step S109 that the resource usage value Ri does not exceed the target value T (NO), the procedure proceeds to step S111.

In step S113 after exiting from the loop from step S107 to step S112, the connection pool controlling part 150 pools, in the pool part 154, a sufficient amount of connection for each physical node having a resource usage value Ri smaller than the target value T (Ri<T) according to the rate of connection distribution, and the procedure loops to processing step S101 to wait until the next interval of time has elapsed. The processing for controlling the pool volume in step S113 causes the connection resolving part 152 to distribute new connections including reconnections and new connections in round-robin fashion according to the decided rate of connection distribution. Assuming that a common distributed database server entity is deployed on each physical node i (i=1, ..., I), the probability Si of allocating a connection to each physical node becomes a relation as shown in the following mathematical expression (3) (FIG. 8):

[Expression 3]

$$S_i = \frac{T - R_i}{I \cdot T - \sum_{j=1}^{I} R_j} = \frac{T - R_i}{C \cdot r} \quad (3)$$

Figure 8:
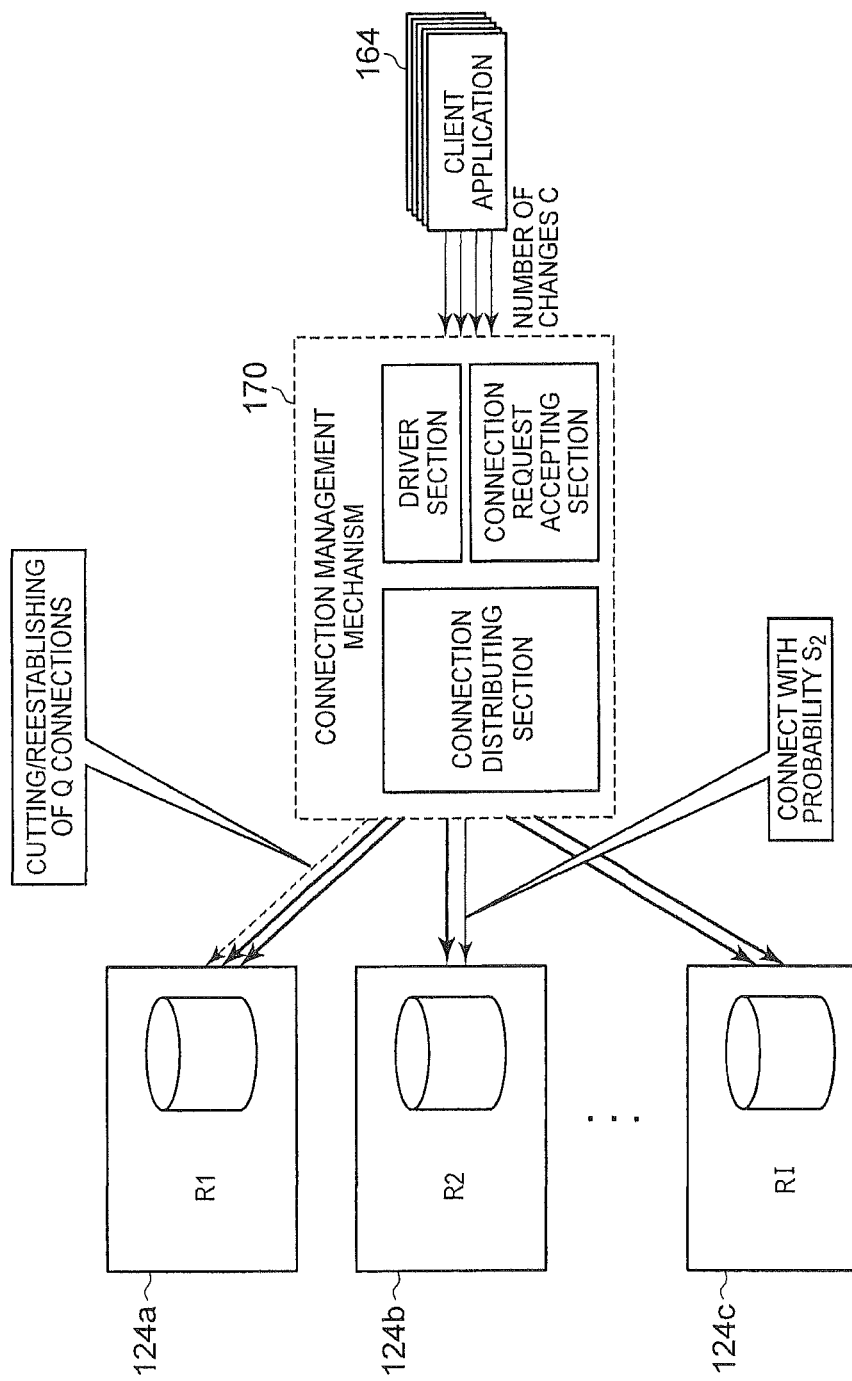
FIG. 8 is a diagram for describing the reestablishment of connections and probabilistic distribution of the connections.

On the other hand, if it is determined in step S109 that the resource usage value Ri exceeds the target value T (YES), the procedure proceeds to step S110. In step S110, the dynamic balance planning part 148 requests the driver section 162 to cut and reestablish a connection to a server entity of a focused distributed database on each physical node among the number of connections Q corresponding to the difference of the resource usage value Ri of the physical node exceeding the target value T for the focused distributed database (FIG. 8). Here, the number of connections Q corresponding to the above difference upon which cutting the connection of each physical node i is requested can be calculated according to the following mathematical expression (4):

[Expression 4]

$$Q = \frac{R_i - T}{r} \quad (4)$$

Then, when two or more distributed database server entities are accommodated on the physical node i, connections corresponding to the resource usage rate of the focused distributed database on the physical node i in the total number of connections Q are reestablished in step S110. The driver section 162 that has received the reconnection request cuts the connections related to the reconnection request and changes them to new connections at the timing of transaction boundaries.

In an embodiment of the present invention, connection distribution is carried out according to the load status of physical nodes as mentioned above, so that the load can be moved from physical nodes with load heavier than the target to physical nodes with load lighter than the target, and hence the peak of the entire load on the physical node group 120 can be evened out. According to the embodiment of the present invention, such operations with a low performance cost as to monitor dynamically changing load status and dynamically changing the rate of connection distribution with the client along with changes in load status are performed, so that the total load on the physical nodes can be balanced, thereby making effective use of physical resources.

In the load balancing method using the connection distribution according to the embodiment, database deployment can be planned without regard to the load status difficult to predict. Further, since load balancing is accomplished by controlling the connection distribution of each distributed database to the master and a replica(s), the load can be evened out appropriately with local planning and operations alone, and this can adaptively cope with a sudden overload or redundant resources difficult to deal with by enhancing the physical resources or adding replicas.

In addition, since connections corresponding to an amount of load exceeding the target value are reestablished at transaction boundaries, cutting of the connections is hidden from the user, i.e., the cutting is transparent to the user. Thus, even a user who maintains connections for a long time can be targeted for connection distribution.

Details of Database Deployment Plan

Database Deployment Planning Method

The following will describe processing for planning database deployment advantageous to load balancing using connection distribution. Here, it is assumed that the number of distributed databases is N, the multiplicity of each distributed database is M, and the number of physical nodes is K. It is also assumed that the multiplicity of each distributed database is common for the sake of description, though not intended to exclude the assignment of different multiplicities.

Further, since the load balancing method using connection distribution according to the embodiment of the present invention aims at load balancing of physical nodes each accommodating two or more distributed database server entities, the method is on the precondition that database deployment can cause a combination(s) of server sets on physical nodes. Therefore, it is required to satisfy M≥2 and K<M·N. Further, when the multiplicity M of distributed databases exceeds the number of physical nodes K, two or more server entities of the same distributed database are always deployed on the same physical node. When the multiplicity M of distributed databases is equal to the number of physical nodes K, all the distributed database server entities are deployed on each physical node, so that the load cannot be moved in practice. Therefore, M<K becomes an additional condition.

Figure 9:
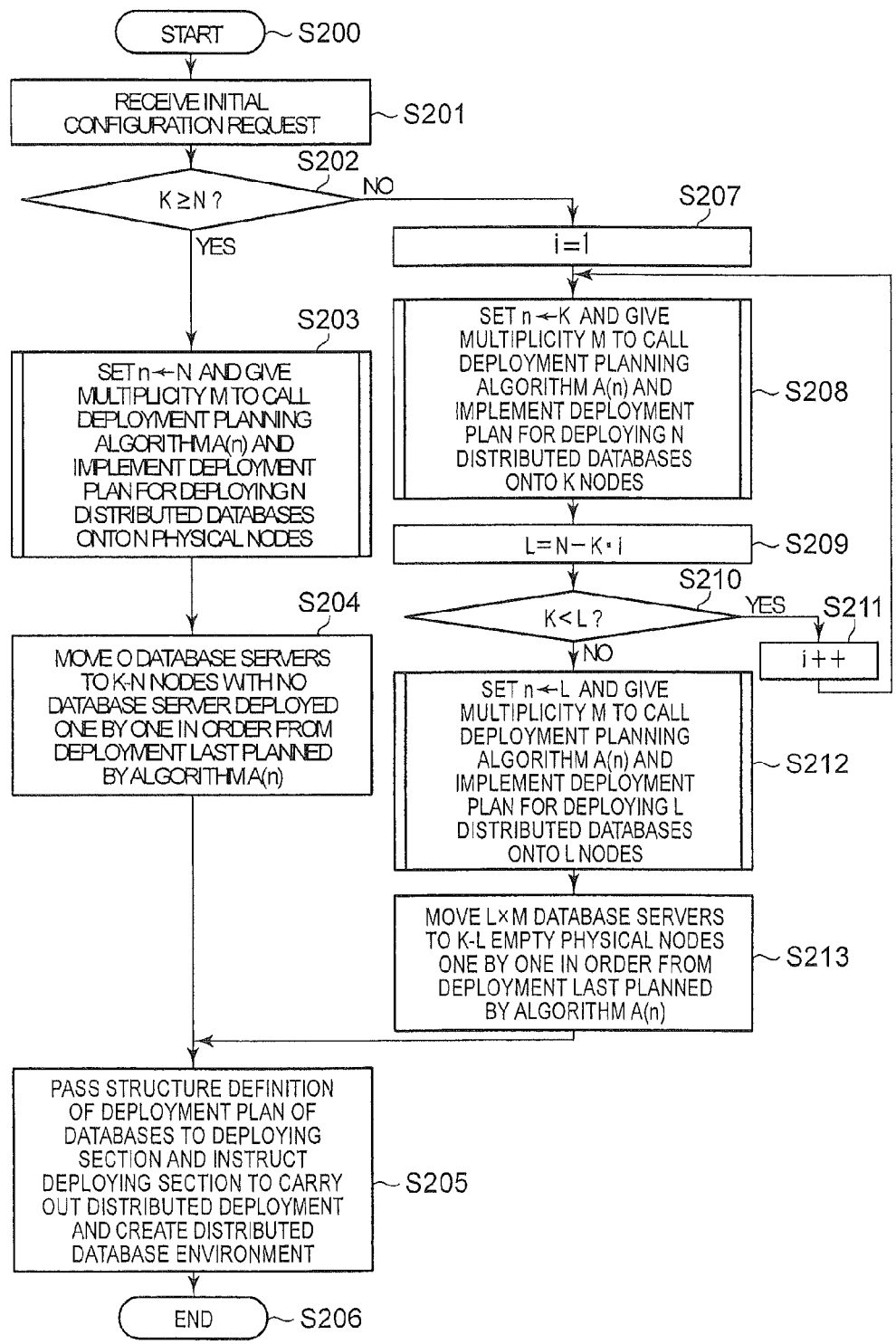
FIG. 9 is a flowchart showing database deployment planning processing performed by a deployment planning section according to an embodiment of the present invention.

FIG. 9 is a flowchart showing database deployment planning processing performed by the deployment planning section according to the embodiment of the present invention. The processing shown in FIG. 9 starts at step S200 in response to an instruction from a system administrator to carry out initial deployment. In step S201, the deployment planning section 112 receives the instruction from the system administrator to carry out initial deployment. In step S202, the deployment planning section 112 determines whether the number of physical nodes K is equal to or more than the number of distributed databases N, and branches the processing flow depending on the magnitude relation between the number of physical nodes K and the number of distributed databases N.

In step S202, if it is determined that the number of physical nodes K is equal to or more than the number of distributed databases N (YES), the procedure branches to step S203. In step S203, the deployment planning section 112 calls a deployment planning algorithm A(n) for deploying n distributed databases onto n physical nodes to implement a deployment plan for deploying N distributed databases onto N physical nodes in K physical nodes. To be more specific, the deployment planning section 112 sets n←N and gives the multiplicity M as a parameter to call the deployment planning algorithm A(n) and implement the deployment plan for deploying masters and replicas of N distributed databases onto any N physical nodes in K physical nodes. Thus, the deployment of M database server entities of N distributed databases on N physical nodes is planned, remaining K−N physical nodes in K physical nodes are prepared as empty nodes on which no database is deployed. The details of the deployment planning algorithm A(n) will be described further herein.

In step S204, the deployment planning section 112 moves O database server entities in N×M database server entities the deployment of which is planned in step S203 to K−N empty nodes with no database deployed and left in step S203 one by one in order from the last one in the deployment plan. The number of server entities O to be moved can be calculated according to the following mathematical expression (5):

[Expression 5]

$$\left\lfloor \frac{M \cdot N}{K}(K - N) \right\rfloor \text{PIECES} \quad (5)$$

In the above mathematical expression (5), the square bracket notation with the top portion omitted represents a floor function. The above mathematical expression (5) illustrates a function for calculating the number of moves to equalize the number of server entities deployed on each physical node, but the calculation is not particularly limited to the use thereof, and a ceiling function may be used instead of the floor function, for example.

Figure 10A:
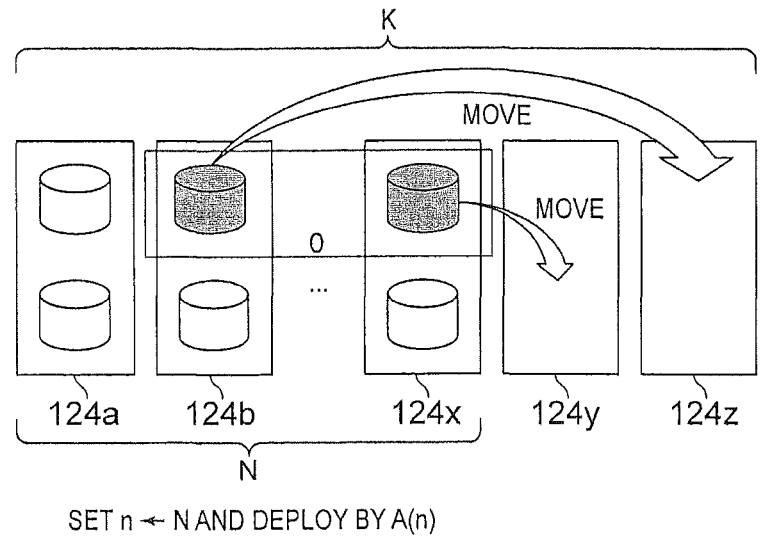
FIG. 10 is a diagram for describing a method of deploying each distributed database server entity onto a physical node.

FIG. 10 is a diagram for describing a method of deploying distributed database server entities onto physical nodes. FIG. 10A shows a deployment method when the number of physical nodes K is equal to or more than the number of distributed databases N. As shown in FIG. 10A, when the number of physical nodes K is equal to or more than the number of distributed databases N, the deployment of M server entities of N distributed databases onto N physical nodes in K physical nodes is planned, and then distributed evenly to the remaining K–N empty nodes. As a result, the server entities are deployed evenly onto the K physical nodes.

In step S205, the deployment planning section 112 passes, to the deploying section 114, the structure definition of the database deployment planned in step S203 and step S204 as mentioned above, and instructs the deploying section 114 to carry out distributed deployment and create a distributed database environment. After that, the processing is ended at step S206.

On the other hand, if it is determined in step S202 that the number of physical nodes K is less than the number of distributed databases N (NO), the procedure branches to step S207. In step S207, the deployment planning section 112 first sets and in step S208, it calls the deployment planning algorithm A(n) to implement a deployment plan for deploying K distributed databases in N onto K physical nodes. To be more specific, the deployment planning section 112 sets n←K and gives the multiplicity M as a parameter to call the deployment planning algorithm A(n) and implement the deployment plan for deploying masters and replicas of any K distributed databases in N onto K physical nodes. Thus, the deployment of M server entities of K distributed databases onto K physical nodes is planned. In step S209, the number of unplanned distributed databases L is calculated according to the following mathematical expression (6):

[Expression 6]

$$L = N - K \cdot i \qquad (6)$$

In step S210, the deployment planning section 112 determines whether the number of unplanned distributed databases L exceeds the number of physical nodes K. If it is determined in step S210 that the number of unplanned distributed databases L exceeds the number of physical nodes K (YES), the processing branches to step S211 to increment i and the processing loops to step S208. Thus, the deployment plan of further K distributed databases in the number of unplanned distributed databases L is implemented. On the other hand, if it is determined in step S210 that the number of unplanned distributed databases L is equal to or less than the number of physical nodes K (NO), the processing branches to step S212.

In step S212, the deployment planning section 112 sets n←L and gives the multiplicity M as a parameter to call the deployment planning algorithm A(n) and implement a deployment plan for deploying masters and replicas of the remaining L distributed databases less than K onto L physical nodes. In step S213, the deployment planning section 112 moves L×M database server entities the deployment of which is planned in step S212 to the other K–L physical nodes one by one in order from the last one in the deployment plan. As in the above mathematical expression (5), the number of server entities to be moved can be set as a function for calculating the number of moves to equalize the number of server entities deployed on each physical node.

In step S205, the deployment planning section 112 passes, to the deploying section 114, the structure definition of the database deployment planned in step S207 to step S213, and instructs the deploying section 114 to carry out distribution and create a distributed database environment. After that, the processing is ended at step S206.

Figure 10B:
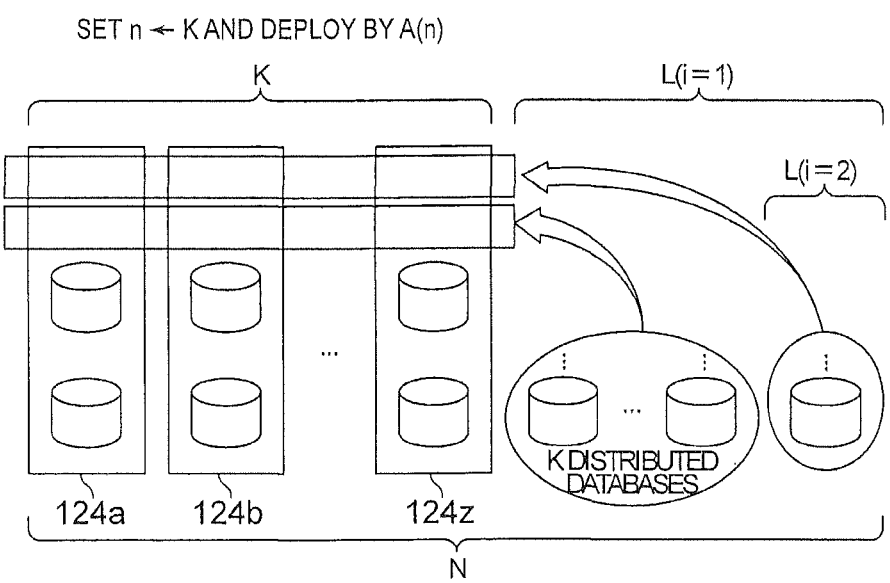

FIG. 10B is a diagram for describing a deployment method when the number of physical nodes K is less than the number of distributed databases N. As shown in FIG. 10B, when the number of physical nodes K is less than the number of distributed databases N, K distributed databases in N are first deployed onto K physical nodes. Then, the deployment of every K distributed databases is planned in the same procedure until the number of remaining distributed databases becomes less than K. When the number of remaining distributed database L becomes less than K, the deployment plan for deploying L distributed databases onto L physical nodes is implemented to distribute server entities to K–L physical nodes in order from the last on in the deployment in order to deploy the server entities evenly on the K physical nodes.

Deployment Planning Algorithm A(n)

Figure 11:
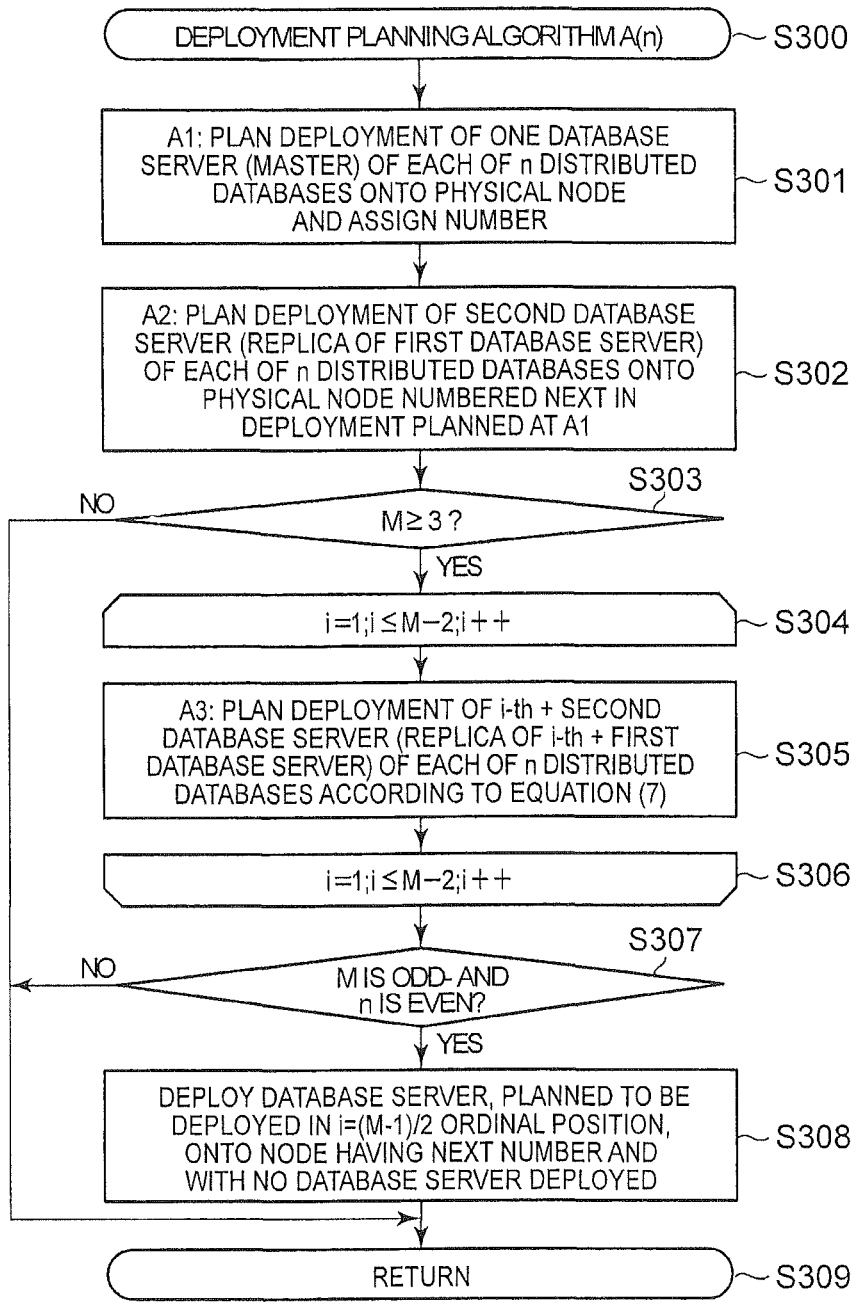
FIG. 11 is a flowchart showing processing of a deployment planning algorithm A(n) performed by the deployment planning section according to an embodiment of the present invention.

FIG. 11 is a flowchart showing processing of the deployment planning algorithm A(n) performed by the deployment planning section according to the embodiment of the present invention. The processing shown in FIG. 11 is called at step S203, step S208, or step S212 shown in FIG. 10 to start at step S300. In step S301, the deployment planning section 112 plans the deployment of one database server entity (e.g. master) of each of n distributed databases onto n physical nodes, and assigns numbers to each physical node and each distributed database (A1 in FIG. 12).

Figure 12:
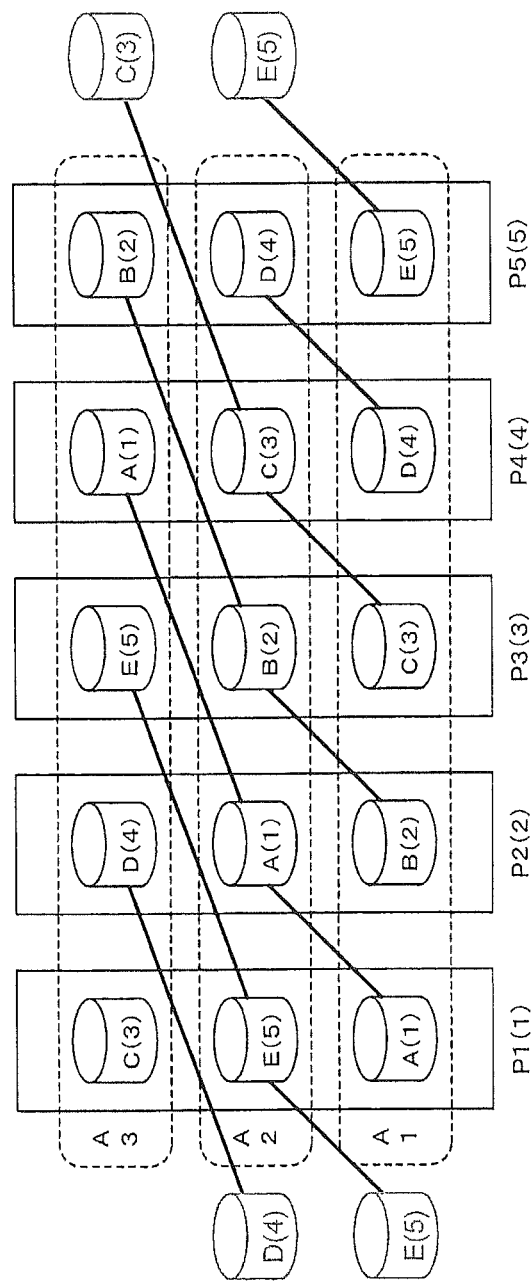
FIG. 12 is a diagram for describing the deployment planning algorithm A(n).

In step S302, the deployment planning section 112 plans the deployment of another one of database server entities of the n distributed databases (e.g., replica of the first one) onto physical nodes having the following numbers of physical nodes deployed in step S301, respectively (A2 in FIG. 12). Here, the "following numbers" are values from 1 to n, and (n+1) wraps to 1. In step S301 and step S302, when the sides connecting between physical nodes on which the same distributed database server entity is deployed are put end to end, a ring consisting of n physical nodes is created. This ring forms a cluster, and the use of this deployment planning algorithm expands the cluster to have a number of nodes n.

In step S303, the deployment planning section 112 determines whether the multiplicity M is three or more. If it is determined in step S303 that the multiplicity M is less than three (NO), the processing branches to step S309, the processing is ended to return the processing to the caller. On the other hand, if it is determined in step S303 that the multiplicity M is three or more (YES), the processing proceeds to a loop from step S304 to step S306.

In the loop from step S304 to step S306, the processing step S305 is repeated M–2 times to plan the deployment of the remaining replicas of each distributed database. In step S305, the deployment of the i-th database server (i.e., replica of the i+1-th one) in the remaining replicas of n distributed databases is planned according to the following mathematical expression (7) (A3 in FIG. 12).

[Expression 7]

$$\left\lceil \frac{n-2}{M-1} \cdot i \right\rceil + k + 1 - th \qquad (7)$$

In the above mathematical expression (7), the square bracket notation with the bottom portion omitted represents a ceiling function. Further, in the above mathematical expression (7), k is a number assigned in step S301 and i is a number for identifying each replica left in step S301 and step S302 in the distributed database instances. The above mathematical expression (7) illustrates a function for deploying n distributed databases server entities onto the above ring of the physical nodes in a manner to have the longest distance, but not particularly limited thereto. In step S307 after exiting from the loop from step S304 to step S306, the deployment planning section 112 determines whether such conditions that M is odd and n is even are satisfied. If it is determined in step S307 that such conditions that M is odd and n is even are not satisfied (NO), the processing is ended at step S309 to return the processing to the caller.

On the other hand, if it is determined in step S307 that such conditions that M is odd and n is even are satisfied (YES), the procedure proceeds to step S308. In step S308, the deployment planning section 112 deploys database servers, deployed in the i=(M−1)/2 ordinal positions, onto physical nodes next numbered and with no database server deployed so that combinations of k-th and k+n−1-th databases deployed will not overlap with one another. Thus, such database deployment that a flow of connection distribution is distributed across n physical nodes is planned.

According to the above-mentioned database deployment processing, such database deployment that the above-mentioned load has a transferable relation, the cluster size is maximized, and the number of nodes in the cluster corresponds exactly to the number of physical nodes K is planned. This makes it possible to carry out load balancing in the entire physical node group using the above-mentioned connection distribution.

Exchange of Database Deployment

The following will describe an auxiliary configuration for reducing load imbalance in a long-term span. The auxiliary configuring section 116 of the embodiment has the function of monitoring load imbalance between physical nodes in a long-term span and altering or correcting the database deployment appropriately to eliminate the load imbalance. Here, the load imbalance between physical nodes in the long-term span means uneven load distribution normalized in the physical node group 120, which can be determined from the average value of the evaluation amounts of load on respective physical nodes for a fixed period of time. The evaluation amount of load on each physical node is controlled by the above-mentioned connection distribution to approach asymptotically to the target value T. However, when load is concentrated to a certain distributed database, the load could be unevenly distributed across multiple physical nodes.

Figure 13:
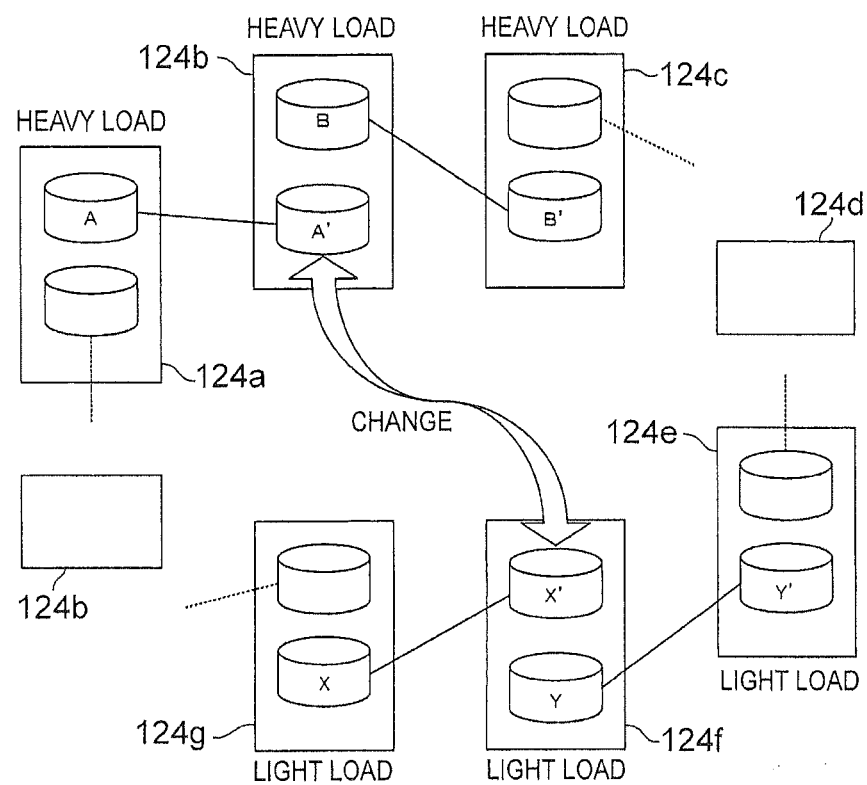
FIG. 13 is a diagram illustrating load distribution in database deployment in which distributed databases are deployed in a distributed manner with a multiplicity of 2 in the form of a circle.
Figure 14A:
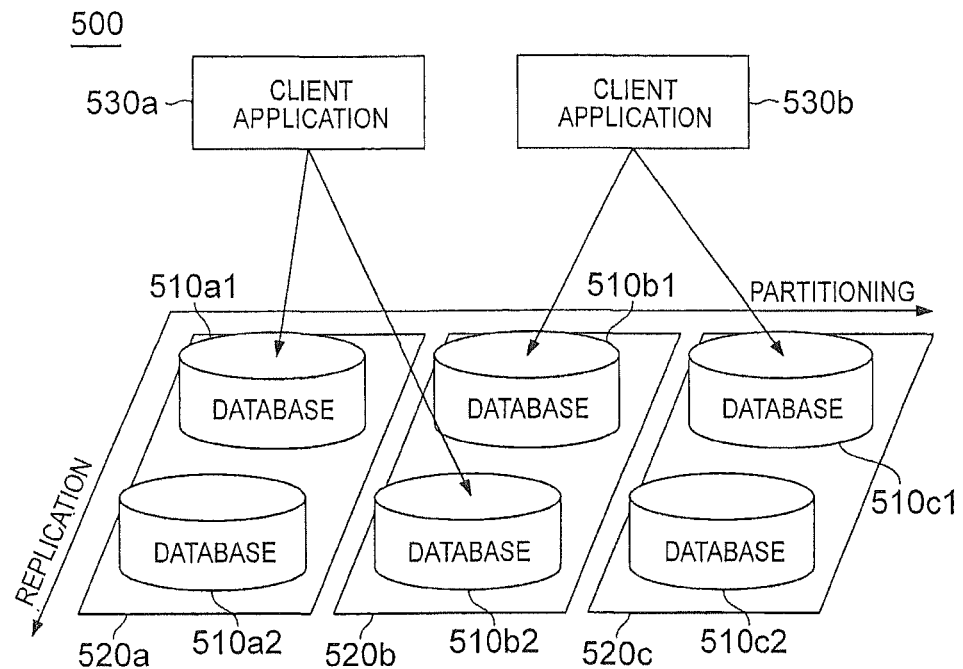
FIG. 14 illustrates a schematic diagram showing a distributed database environment in a conventional technique in A, and a diagram for describing a method of deploying database servers of distributed databases in combination.
Figure 14B:
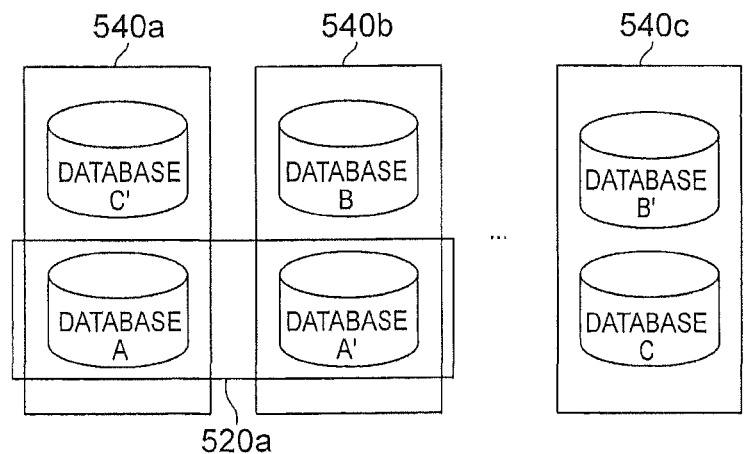

FIG. 13 is a diagram illustrating load distribution in database deployment in which distributed databases are deployed in a distributed manner with a multiplicity of 2 in the form of a ring. In FIG. 13, database deployment using the above-mentioned transferable relation, rather than the physical arrangement of physical nodes, is represented. In the ring formed of physical nodes as shown in FIG. 13, if load is concentrated to a distributed database, load on two or more adjacent physical nodes could be increased as compared with load on the other nodes. In this case, the load cannot be moved between the adjacent physical nodes efficiently.

Therefore, the auxiliary configuring section 116 acquires performance information from the connection distributing section 140 to monitor such a normalized load imbalance. When detecting a normalized load imbalance, the auxiliary configuring section 116 modifies the database deployment plan created by the deployment planning section 112 so that any one of server entities operated on physical nodes with unevenly distributed load (e.g., replica A') will be exchanged with another server entity (e.g., replica X') operated on a physical node with a relatively light load placed thereon, and urges the deploying section 114 to carry out the database deployment. Note that since the exchange of replicas is higher in performance cost than the connection distribution, it can be made selectively in a low-load time slot such as midnight or at the timing of maintenance. The auxiliary configuring section 116 constitutes a deployment exchanging section of the embodiment.

In the aforementioned embodiment, the connection request accepting section 160 and the driver section 162 are implemented on the application server 130 on which client applications run, with the connection distributing section 140 implemented as another device on the connection distribution server 132. However, the configuration is not limited to that shown in FIG. 1, and the connection distributing section 140, the connection request accepting section 160, the driver section 162, and the clients 164 may be implemented in another embodiment on the same server 134 as indicated by the broken line in FIG. 1.

Further, in the aforementioned embodiment, the database deployment server 110 is implemented as another apparatus separated from the application server 130 and the connection distribution server 132; however, it will be understood the database deployment server 110 may be configured integrally with the application server 130 or the connection distribution server 132, or integrally on the server 134.

As described above, according to the aforementioned embodiment, there can be provided, in a distributed database environment, an information processing system, an information processing apparatus, a load balancing method, a database deployment planning method, and a program, capable of balancing the load on physical nodes using an technique which is adaptive and flexible in a situation of a sudden overload or redundant physical resources with a low performance cost of operations to create an efficient distributed database environment on limited physical resources.

The above-mentioned functions of the present invention may be implemented by a machine-executable program described in a legacy programming language, such as assembler, C, C++, Java®, JavaBeans®, Java® Applet, JavaScript®, Perl, or Ruby, or an object-oriented programming language, and may be distributed in the form of being stored in a machine-readable recording medium, such as a ROM, an EEPROM, an EPROM, a flash memory, a flexible disk, a CD-ROM, a CD-RW, a DVD-ROM, a DVD-RAM, a DVD-RW, a blue-ray disc, an SD card, or an MO.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An information processing system comprising:
    a plurality of database servers each having at least one processor deployed onto a plurality of physical nodes in a distributed manner, wherein among the plurality of database servers, at least two servers taking care of data different from one another are deployed onto the same physical node and at least one server taking care of the same data as any of the at least two servers is deployed onto at least one other physical node;
    a distribution section having a processor for distributing connections by monitoring load on each of the physical nodes and moving a connection with a client from a database server on a physical node with load heavier than a target to a database server on a physical node with load lighter than the target so that the connections are distributed to balance the load;
    a deployment planning section having a processor for planning deployment of the plurality of database servers in such a manner that the at least two servers taking care of the same data are not deployed on the same physical node and for acquiring deployment information;
    a deployment exchanging section for detecting load imbalance among the plurality of physical nodes and exchanging data taken care of by a database server on a physical node with an imbalanced load thereon for data taken care of by a database server on another physical node; and
    a load status calculating section having a processor for calculating load status for each of the physical nodes based on both node performance information, which includes at least one of a usage rate of each of physical resources of each physical node and a total number of connections of each physical node, and deployment information acquired from the deployment planning section for each physical node.

2. The information processing system according to claim 1, wherein
    the distribution section includes a balance planning section for planning reconnection of a number of connections corresponding to an amount of load exceeding the target to plan new connection distribution including the reconnection with a probability corresponding to an amount of load below the target,
    the information processing system further comprising a reconnection control section for once cutting connections, the reconnection of which is planned, at transaction boundaries and acquiring new connections related to the reconnection, and
    the moving is done by cutting the connections, the reconnection of which is planned, and acquiring the new connections.

3. The information processing system according to claim 2, wherein
    the distribution section further includes a pool controlling part for controlling a volume of a pool of connections established to each of the database servers according to a rate of the planned distribution, and a connection resolving part for returning, in response to a connection acquisition request, a connection established to a database server taking care of data related to the request from among pooled connections,
    the information processing system further comprising a connection request accepting section for issuing an acquisition request to the connection resolving part in response to a request for reconnection from the reconnection control section or a request for a new connection from the client, receiving a returned connection, and establishing a connection between the client and the database server.

4. The information processing system according to claim 3, wherein different server sets are deployed on at least two physical nodes, respectively, on which servers taking care of the same data are deployed as the same elements, respectively.

5. The information processing system according to claim 4, wherein the plurality of database servers form a graph plotted by a chain of sides connecting between servers taking care of the same data, and a number of nodes in the graph including physical nodes as nodes on which the at least two servers taking care of data different from one another are deployed is equal to a number of physical nodes onto which the plurality of database servers are deployed in a distributed manner.

6. The information processing system according to claim 2, wherein
    the distribution section further includes a performance acquiring part for acquiring performance information on the plurality of database servers, a deployment acquiring part for acquiring a deployment structure of the plurality of database servers, and a load calculating part for calculating load for each of the physical nodes from the performance information and the deployment structure, and
    the balance planning section calculates a control target value from the load for each of the physical nodes, an amount of increase in a number of estimated connections, and load per connection, and further determines a rate of connection distribution.

7. An information processing system comprising:
    a plurality of database servers deployed onto a plurality of physical nodes in a distributed manner, wherein among the plurality of database servers, a first server taking care of first data and a second server taking care of second data are deployed onto a first physical node, and a third server taking care of the first data is deployed onto a second physical node;
    a distribution section having a processor for monitoring load on the first physical node and the second physical node, and when the load on the first physical node is heavier than a target and the load on the second physical node is lighter than the target, a connection with a client to the first server on the first physical node is moved to the third server on the second physical node;
    a deployment planning section having a processor for planning deployment of the plurality of database servers in such a manner that the at least two servers taking care of the same data are not deployed on the same physical node and for acquiring deployment information;
    a deployment exchanging section for detecting load imbalance among the plurality of physical nodes and exchanging data taken care of by a database server on a physical node with an imbalanced load thereon for data taken care of by a database server on another physical node; and
    a load status calculating section having a processor for calculating load status for each of the physical nodes based on node performance information, which includes at least one of a usage rate of each of physical resources of each physical node and a total number of connections of each physical node, and deployment information acquired from the deployment planning section for each physical node.

8. An information processing apparatus connected to a plurality of physical nodes through a network, comprising:

a pool part for pooling a plurality of connections to a plurality of database servers deployed onto the plurality of physical nodes in a distributed manner, wherein among the plurality of database servers, at least two servers taking care of data different from one another are deployed onto the same physical node, and at least one server taking care of the same data as any of the at least two servers is deployed onto at least one other physical node; and a distribution section for distributing connections by monitoring load on the physical nodes and moving a connection with a client from a database server on a physical node with load heavier than a target to a database server on a physical node with load lighter than the target so that the connections are distributed to balance the load;

a deployment planning section having a processor for planning deployment of the plurality of database servers in such a manner that the at least two servers taking care of the same data are not deployed on the same physical node and for acquiring deployment information;

a deployment exchanging section for detecting load imbalance among the plurality of physical nodes and exchanging data taken care of by a database server on a physical node with an imbalanced load thereon for data taken care of by a database server on another physical node; and a load status calculating section having a processor for calculating load status for each of the physical nodes based on node performance information and deployment information acquired from the deployment planning section for each physical node.

9. The information processing apparatus according to claim 8, wherein the distribution section includes a balance planning part for planning reconnection of a number of connections corresponding to an amount of load exceeding the target to plan new connection distribution including the reconnections with a probability corresponding to an amount of load below the target, and the moving is done by cutting the connections, the reconnection of which is planned, and acquiring the new connections.

10. The information processing apparatus according to claim 9, wherein the distribution section further includes a pool controlling part for controlling a volume of a pool of connections established to each of the database servers according to a rate of the planned distribution, and a connection resolving part for returning, in response to a connection acquisition request, a connection to be established to a database server related to the request from among the connections pooled in the pool part.

11. An information processing apparatus connected to a plurality of physical nodes through a network, comprising a deployment planning section for creating a plan to deploy a plurality of database servers onto the plurality of physical nodes in a distributed manner to plan database deployment in such a manner that, among the plurality of database servers, at least two servers taking care of the same data are not deployed onto the same physical node, at least two servers taking care of data different from one another are deployed onto the same physical node, and at least one server taking care of the same data as any of the at least two servers taking care of the same data and the at least two servers taking care of data different from one another is deployed onto at least one other physical node, respectively, to make a connection with a client transferable from a database server on a physical node with load heavier than a target to a database server on a physical node with load lighter than the target;

a deployment exchanging section for detecting load imbalance among the plurality of physical nodes and exchanging data taken care of by a database server on a physical node with an imbalanced load thereon for data taken care of by a database server on another physical node; and a load status calculating section having a processor for calculating load status for each of the physical nodes based on node performance information, which includes at least one of a usage rate of each of physical resources of each physical node and a total number of connections of each physical node, and deployment information acquired from the deployment planning section for each physical node.

12. The information processing apparatus according to claim 11, wherein the deployment planning section deploys each of the plurality of database servers in such a manner that different server sets are deployed on at least two physical nodes, respectively, on which servers taking care of the same data are deployed as the same elements, respectively.

13. The information processing apparatus according to claim 12, wherein the deployment planning section deploys each of the plurality of database servers in such a manner that, among the plurality of database servers, a graph is formed by a chain of sides connecting between servers taking care of the same data to include physical nodes as nodes on which the at least two servers taking care of data different from one another, and a number of nodes in the graph is equal to a number of physical nodes onto which the plurality of database servers are deployed in a distributed manner.

14. The information processing apparatus according to claim 13, wherein the deployment planning section deploys each of the plurality of database servers in such a manner that, on a ring formed by a chain of sides connecting two physical nodes on which two servers taking care of the same data among the plurality of database servers are deployed, other servers taking care of the same data as the two servers are deployed a distance away from the two servers.

15. A load balancing method executed by an information processing apparatus connected to a plurality of physical nodes through a network, in which a plurality of database servers are deployed onto the plurality of physical nodes in a distributed manner, the plurality of database servers being characterized in that at least two servers taking care of data different from one another in the plurality of database servers are deployed onto the same physical node in the plurality of physical nodes and at least one server taking care of the same data as any of the at least two servers is deployed on at least one other physical node, the load balancing method comprising:

the information processing apparatus monitoring load on each of the physical nodes; wherein the load is calculated for each of the physical nodes based on node performance information, which includes at least one of a usage rate of each of physical resources of each physical node and a total number of connections of each physical node, and deployment information acquired for each physical node;

the information processing apparatus issuing a request to cut a connection with a client to a database server on a physical node with load heavier than a target in the plurality of database servers at a transaction boundary;

the information processing apparatus detecting load imbalance among the plurality of physical nodes and exchanging data taken care of by a database server on a physical node with an imbalanced load thereon for data taken care of by a database server on another physical node; and the information processing apparatus acquiring a new connection related to reconnection with the client to a database server on a physical node with load lighter than the target in the plurality of database servers.

16. The load balancing method according to claim 15, wherein the monitoring the load further includes the information processing apparatus planning new connection distribution including reconnection at a probability corresponding to an amount of load below the target, and the information processing apparatus planning reconnection of a number of connections corresponding to an amount of load exceeding the target.

17. The load balancing method according to claim 16, wherein the monitoring the load further includes the information processing apparatus controlling a volume of a connection pool according to a rate of distribution, and the acquiring a new connection includes the information processing apparatus returning, in response to a connection acquisition request from the client, a connection established to a database server related to the request among the pooled connections.

18. A method of creating a plan executed by an information processing apparatus connected to a plurality of physical nodes through a network to deploy a plurality of database servers onto the plurality of physical nodes in a distributed manner, the method comprising:

the information processing apparatus planning database deployment in such a manner that, among the plurality of database servers, at least two servers taking care of the same data are not deployed onto the same physical node, at least two servers taking care of data different from one another are deployed onto the same physical node, and at least one server taking care of the same data as any of the at least two servers taking care of the same data and the at least two servers taking care of data different from one another is deployed onto at least one other physical node, respectively, the information processing apparatus detecting load imbalance among the plurality of physical nodes and exchanging data taken care of by a database server on a physical node with an imbalanced load thereon for data taken care of by a database server on another physical node;

wherein the planned deployment is implemented via the planning to make a connection with a client transferable from a database server on a physical node with load heavier than a target to a database server on a physical node with load lighter than the target and wherein the a load is calculated for each of the physical nodes based on node performance information, which includes at least one of a usage rate of each of physical resources of each physical node and a total number of connections of each physical node, and deployment information acquired for each physical node.

19. The database deployment planning method according to claim 18, wherein the planning includes:

the information processing apparatus planning that, among the plurality of database servers, servers taking care of the same data are deployed onto physical nodes two by two in such a manner to form a ring by means of sides connecting between two physical nodes on which two servers taking care of the same data are deployed, respectively, and the information processing apparatus planning deployment of other database servers to plan that the other servers taking care of the same data as the two servers are deployed a distance away from the two servers.

20. The database deployment planning method according to claim 19, further comprising:

detecting load imbalance among the physical nodes in a set span; and exchanging data taken care of by a database server on a physical node with an imbalanced load thereon for data taken care of by a database server on another physical node.

21. A computer-executable program stored on a non-transitory computer-readable medium and causing a computer system including at least one computer to implement:

a pool part for pooling a plurality of connections via the computer to a plurality of database servers deployed onto a plurality of physical nodes in a distributed manner, wherein among the plurality of database servers, at least two servers taking care of data different from one another are deployed onto the same physical node and at least one server taking care of the same data as any of the at least two servers is deployed onto at least one other physical node; and a distribution section for distributing connections via the computer by monitoring load on the physical nodes and moving a connection with a client from a database server on a physical node with load heavier than a target to a database server on a physical node with load lighter than the target so that the connections are distributed to balance the load;

a deployment planning section having a processor for planning deployment of the plurality of database servers in such a manner that the at least two servers taking care of the same data are not deployed on the same physical node and for acquiring deployment information;

a deployment exchanging section for detecting load imbalance among the plurality of physical nodes and exchanging data taken care of by a database server on a physical node with an imbalanced load thereon for data taken care of by a database server on another physical node; and a load status calculating section having a processor for calculating load status for each of the physical nodes based on node performance information, which includes at least one of a usage rate of each of physical resources of each physical node and a total number of connections of each physical node, and deployment information acquired from the deployment planning section for each physical node.

22. A computer-executable program stored on a non-transitory computer-readable medium and causing a computer system including at least one computer to implement:

a deployment planning section for creating a plan to deploy a plurality of database servers onto a plurality of physical nodes via the computer in a distributed manner to plan the deployment in such a manner that, among the plurality of database servers, at least two servers taking care of the same data are not deployed onto the same physical node, at least two servers taking care of data different from one another are deployed onto the same physical node, and at least one server taking care of the same data as any of the at least two servers taking care of the same data and the at least two servers taking care of data that is different from one another is deployed onto at least one other physical node, respectively, to make a connection with a client transferable from a database server on a physical node with load heavier than a target to a database server on a physical node with load lighter than the target;

a deployment planning section having a processor for planning deployment of the plurality of database servers in such a manner that the at least two servers taking care of the same data are not deployed on the same physical node and for acquiring deployment information;

a deployment exchanging section for detecting load imbalance among the plurality of physical nodes and exchanging data taken care of by a database server on a physical node with an imbalanced load thereon for data taken care of by a database server on another physical node; and a load status calculating section having a processor for calculating load status for each of the physical nodes based on node performance information, which includes at least one of a usage rate of each of physical resources of each physical node and a total number of connections of each physical node, and deployment information acquired from the deployment planning section for each physical node.

\* \* \* \* \*